US010130106B2

(12) United States Patent
Van Esbroeck et al.

(10) Patent No.: US 10,130,106 B2
(45) Date of Patent: Nov. 20, 2018

(54) DEVICE AND METHOD FOR SEPARATING A WISHBONE FROM A POULTRY CARCASS

(71) Applicant: MAREL STORK POULTRY PROCESSING B.V., Boxmeer (NL)

(72) Inventors: Maurice Eduardus Theodorus Van Esbroeck, Bemmel (NL); Johannes Antoon Vincent Van Kippersluis, Ede (NL); Roger Pierre Hubertus Maria Claessens, Nijmegen (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 15/740,187

(22) PCT Filed: Jul. 12, 2016

(86) PCT No.: PCT/NL2016/050515
§ 371 (c)(1),
(2) Date: Dec. 27, 2017

(87) PCT Pub. No.: WO2017/018876
PCT Pub. Date: Feb. 2, 2017

(65) Prior Publication Data
US 2018/0184673 A1 Jul. 5, 2018

(30) Foreign Application Priority Data
Jul. 29, 2015 (NL) ...................... 2015235

(51) Int. Cl.
*A22C 21/00* (2006.01)
*B26D 1/04* (2006.01)
(Continued)

(52) U.S. Cl.
CPC ...... *A22C 21/0023* (2013.01); *A22C 21/0053* (2013.01); *A22C 21/0069* (2013.01);
(Continued)

(58) Field of Classification Search
CPC . A22C 21/00; A22C 21/0023; A22C 21/0046; A22C 21/0069
(Continued)

(56) References Cited

U.S. PATENT DOCUMENTS 5,545,083 A * 8/1996 Bargele .............. A22C 21/0069
452/136
6,986,707 B2 * 1/2006 Van Den Nieuwelaar ..................
A22C 21/0023
452/187

(Continued)

FOREIGN PATENT DOCUMENTS

EP 0 931 459 A1 7/1999
EP 1 430 780 A1 6/2004
(Continued)

OTHER PUBLICATIONS

"Poultry Products Processing—An Industry Guide", ISBN 1-58716-060-9, CRC Press LLC, 2002, p. 157 and figure 6.4.
(Continued)

*Primary Examiner* — Richard T Price, Jr.
(74) *Attorney, Agent, or Firm* — Birch, Stewart, Kolasch & Birch, LLP

(57) ABSTRACT

A wishbone separator device for separating a wishbone from a poultry carcass includes a primary wishbone cutter including a front cutter portion including a central front apex, a left and a right front cutting edge, which diverge from said central front apex, a wishbone limb cutter portion, including a left and a right limb cutting edge. An intersection point of an extension of the left limb cutting edge and an extension of the right limb cutting edge is arranged on a center line parallel to the cutting direction through the central front apex. The left and right front cutting edge are arranged forward of the left and right limb cutting edge, respectively
(Continued)

as seen in the cutting direction and outward relative to said imaginary extension line from the left and right limb cutting edge, respectively.

22 Claims, 10 Drawing Sheets

(51) Int. Cl.
  *B26D 5/12* (2006.01)
  *B26D 7/06* (2006.01)
  *B26D 1/00* (2006.01)

(52) U.S. Cl.
  CPC .................. *B26D 1/04* (2013.01); *B26D 5/12* (2013.01); *B26D 7/0625* (2013.01); *B26D 2001/006* (2013.01)

(58) Field of Classification Search
  USPC .................. 452/135, 136, 149–153, 155, 156
  See application file for complete search history.

(56) References Cited

U.S. PATENT DOCUMENTS

| | | | | |
|---|---|---|---|---|
| 8,308,535 B2* | 11/2012 | De Vos | .............. | A22C 21/0069 452/136 |
| 8,500,522 B2* | 8/2013 | Drabbels | ............ | A22C 21/0069 452/136 |
| 8,529,322 B2* | 9/2013 | De Vos | .............. | A22C 21/0069 452/165 |
| 8,801,508 B2* | 8/2014 | Landt | ................. | A22C 21/0069 452/135 |
| 2014/0134935 A1 | 5/2014 | Landt | | |

FOREIGN PATENT DOCUMENTS

| | | |
|---|---|---|
| EP | 1 454 531 A2 | 9/2004 |
| EP | 1 956 919 A2 | 8/2008 |
| EP | 2 289 340 A2 | 3/2011 |
| EP | 2 606 737 A2 | 6/2013 |
| WO | WO 2007/067052 A2 | 6/2007 |
| WO | WO 2011/068402 A2 | 6/2011 |

OTHER PUBLICATIONS

CAMB Machine Knives International: "Drawing No. NC13501 Part# 10/22367 Bevel—Single Bevel & Back Bevel Tip", Oct. 29, 2014, XP055280859, Retrieved from the Internet: URL:http://www.camb-knives.co.uk/files/cache/1090736ac838dd63bd88494ab398b8e4_f70.jpg, [retrieved on Jun. 15, 2016] the whole document.
Dutch Search Report, issued in Priority Application No. 2015235, dated Jun. 16, 2016.
International Search Report, issued in PCT/NL2016/050515, dated Jan. 20, 2017.
Written Opinion of the International Searching Authority, issued in PCT/NL2016/050515, dated Jan. 20, 2017.

* cited by examiner

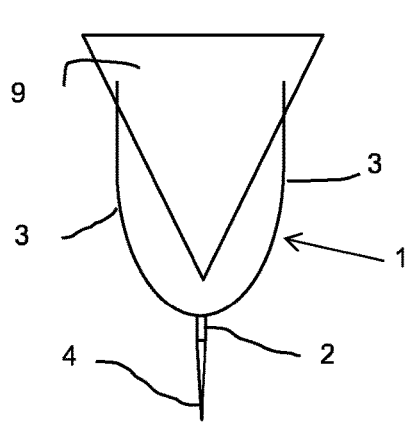
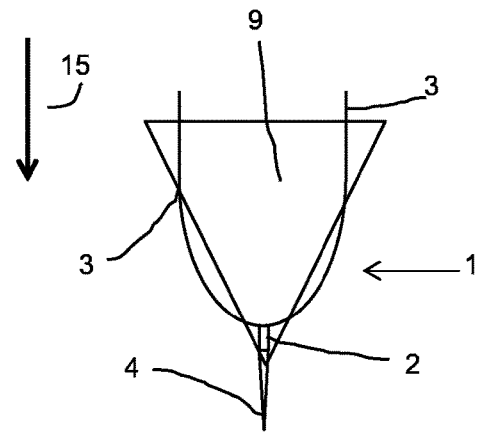
Fig. 7A          Fig. 7B
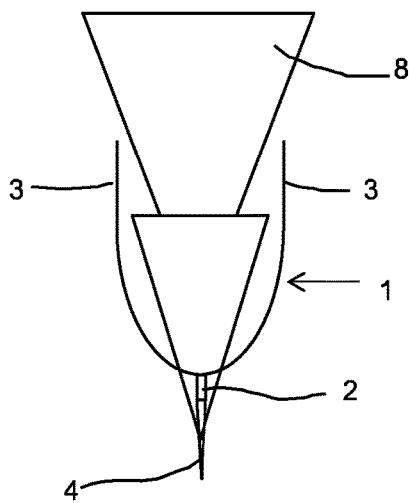
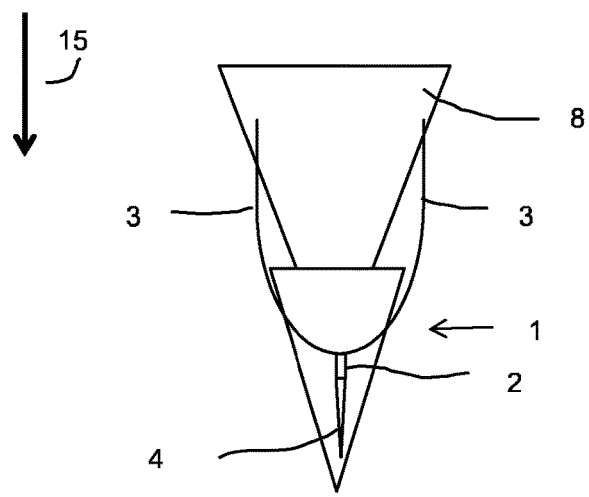
Fig. 8A          Fig. 8B

DEVICE AND METHOD FOR SEPARATING A WISHBONE FROM A POULTRY CARCASS

BACKGROUND OF THE INVENTION

The invention pertains to a device and method for separating a wishbone from a poultry carcass.

The wishbone of a poultry carcass comprises a tip, which is in scientific terms called the hypocledium, and two limbs. The hypocledium is connected to the breastbone of the poultry carcass via a ligament that is called the hypocledial ligament. The hypocledial ligament is connected to the front point of the breastbone, which in scientific terms is known as the carinal apex of the sternum. This is for example explained op page 157 and in FIG. 6.4 of the book "Poultry Products Processing—An Industry Guide", ISBN 1-58716-060-9. The hypocledium has an inward facing surface, which in a live animal faces in the direction of the lungs. Meat is present directly adjacent to this inward facing surface.

DESCRIPTION OF THE RELATED ART

WO2011/068402 pertains to a device and method for processing a poultry carcass of slaughtered poultry and discloses a device and method for separating a wishbone from a poultry carcass of slaughtered poultry. In this known device and method, the wishbone is separated from a poultry carcass by a combined action of three knives: an arrow shaped primary wishbone knife which cuts through the limbs of the wishbone and separates the hypocledium from the meat that is present adjacent to the inward facing surface of the hypocledium. Two secondary wishbone knives are provided that separate the limbs of the wishbone from meat that is present on the outside of the wishbone and sever the hypocledial ligament.

In practice, it has turned out that when using this known method and/or device, sometimes a part of the hypocledium remains in the breast meat after the wishbone has been separated from the poultry carcass.

The invention aims to provide an improved device and method for separating a wishbone from a poultry carcass.

BRIEF SUMMARY OF THE INVENTION

In accordance with a first aspect of the invention, this object is achieved with a wishbone separator device for separating a wishbone from a poultry carcass, said wishbone comprising a hypocledium and two limbs, said hypocledium comprising an inward facing surface,
which wishbone separator device comprises:
a primary wishbone cutter, which is moveable in a cutting direction,
which primary wishbone cutter comprises:
a substantially triangular front cutter portion which is adapted to separate the hypocledium from meat that is present adjacent to the inward facing surface of the hypocledium, which front cutter portion comprises a central front apex that points in the cutting direction and a left front cutting edge and a right front cutting edge, which left front cutting edge and right front cutting edge diverge from said central front apex,
a substantially triangular wishbone limb cutter portion which is adapted to cut through the limbs of the wishbone, which wishbone limb cutter portion comprises a left limb cutting edge and a right limb cutting edge, wherein an intersection point of an imaginary extension line of the left limb cutting edge and an imaginary extension line of the right limb cutting edge is arranged on an imaginary center line that extends in forward and rearward direction parallel to the cutting direction through the central front apex of the front cutter portion, and wherein the left front cutting edge is arranged forward of the left limb cutting edge as seen in the cutting direction and outward relative to said imaginary extension line from the left limb cutting edge and the right front cutting edge is arranged forward of the right limb cutting edge as seen in the cutting direction and outward relative to said imaginary extension line from the right limb cutting edge.

A poultry carcass that can be processed in the wishbone separator device in accordance with the invention is for example an entire made oven-ready poultry carcass, a front half or a breast cap. The poultry carcass contains a wishbone, which wishbone comprises a hypocledium and two limbs. The hypocledium is generally connected to a breastbone of said poultry carcass via a hypocledial ligament. The hypocledium has an inward facing surface, which in a live animal faces in the direction of the lungs. Meat is present adjacent to this inward facing surface. It is not necessary that the entire breastbone is present in the poultry carcass. It is also not necessary that the wishbone of the poultry carcass is fully intact.

The device according to the first aspect of the invention comprises a primary wishbone cutter. This primary wishbone cutter is adapted to separate the hypocledium from meat that is present adjacent to the inward facing surface of the hypocledium and also to cut through the limbs of the wishbone.

The primary wishbone cutter is moveable in a cutting direction. The primary wishbone cutter is for example moveable relative to the poultry carcass and/or relative to a device frame onto which the components of the wishbone separator device in accordance with the first aspect of the invention are optionally mounted. The device frame can in turn be mounted on a stationary workstation frame or a rotatable workstation frame, e.g. a rotatable workstation frame of the type that is used in a carrousel machine. In a carrousel machine, multiple processing devices, e.g. devices in accordance with the first and/or second aspect of the invention, are mounted in a workstation frame that is rotatable about a central axis.

The cutting direction is the direction in which the primary wishbone blade moves relative to the poultry carcass when the limbs of the wishbone are being cut through and the hypocledium is separated from meat that is present adjacent to the inward facing surface of the hypocledium. When the poultry carcass during the processing thereof by the device according to the first aspect of the invention is stationary relative to the device frame, e.g. when the device according to the first aspect of the invention is mounted in a carrousel machine, the cutting direction also is the direction in which the primary wishbone blade moves relative to the device frame when the limbs of the wishbone are being cut through and when the hypocledium is separated from meat that is present adjacent to the inward facing surface of the hypocledium.

The primary wishbone cutter comprises a front cutter portion that is adapted to separate the hypocledium from meat that is present adjacent to the inward facing surface of the hypocledium. The front cutter portion is substantially triangular in shape, and has a central front apex that points in the cutting direction, a left front cutting edge and a right front cutting edge. The left front cutting edge and the right front cutting edge diverge from said central front apex.

The left front cutting edge and the right front cutting edge optionally start directly at the central front apex.

The central front apex can be sharp or rounded.

In a possible embodiment, the left and right front cutting edge are straight or substantially straight, or at least comprise a straight or substantially straight portion.

The primary wishbone cutter further comprises a wishbone limb cutter portion, which is adapted to cut through the limbs of the wishbone. The limb cutter portion comprises a left limb cutting edge and a right limb cutting edge. The wishbone limb cutter portion is substantially triangular in shape.

In a possible embodiment, the left and right wishbone limb cutting edge are straight or substantially straight, or at least comprise a straight or substantially straight portion.

In accordance with the first aspect of the invention, an intersection point of an imaginary extension line of the left limb cutting edge and an imaginary extension line of the right limb cutting edge is arranged on an imaginary center line that extends in forward and rearward direction parallel to the cutting direction through the central front apex of the front cutter portion.

In addition, the left front cutting edge is arranged forward of the left limb cutting edge as seen in the cutting direction and outward relative to said imaginary extension line from the left limb cutting edge. Likewise, the right front cutting edge is arranged forward of the right limb cutting edge as seen in the cutting direction and outward relative to said imaginary extension line from the right limb cutting edge.

With this arrangement of the front cutter portion and the wishbone limb cutter portion, the cutting of the limbs of the wishbone is delayed as compared to the moment of cutting in the device and method according to WO2011/068402.

In the device and method according to WO2011/068402, the primary wishbone knife cuts through the limbs of the wishbone rather early in the process, which makes that the primary wishbone knife still has to travel in the cutting direction over quite a distance before the hypocledium is separated from meat that is present adjacent to the inward facing surface of the hypocledium. It is suspected that the movement of the primary wishbone knife of WO2011/068402 after the cutting of the limbs of the wishbone cause an undesired change in the position of the wishbone, in particular in the cutting direction. It is suspected that this might occur due to friction between the primary wishbone knife and the poultry carcass.

This undesired change in the position of the wishbone leads to the wishbone becoming located at a position that is more forward as seen in the cutting direction than expected based on the anatomical position of the wishbone. This may cause the primary wishbone knife and/or secondary wishbone knives of WO2011/068402 to cut through the hypocledium of the wishbone. The wishbone can move somewhat relative to e.g. the breastbone of the poultry carcass after the limbs of the wishbone have been cut through, because the wishbone is then no longer fixed in position by other bone parts of the poultry carcass, such as the coracoids.

In the device and method according to the first aspect of the invention, the design of the primary wishbone cutter makes that cutting of the limbs by the primary wishbone cutter is postponed, so that the limbs are cut at the same time or later than the separation of the hypocledium and the meat adjacent to its inward facing surface, or at least that the distance which the primary cutter has to travel from the point where it cuts through the limbs of the wishbone to the point where it separates the hypocledium from the meat adjacent to the inward facing surface of said hypocledium is less than in the device and method of WO2011/068402.

When the hypocledium is separated from the meat adjacent to the inward facing surface of said hypocledium prior to or at the same time as the limbs of the wishbone are cut through, the wishbone is held in substantially its anatomical position by other bone parts of the poultry carcass, such as the coracoids, at the moment separating the hypocledium from that meat, despite any friction that may occur between the primary wishbone cutter and the poultry carcass. This makes that the wishbone is where it is expected to be, and the primary wishbone cutter cuts at the anatomically correct position.

When the hypocledium is separated from the meat adjacent to the inward facing surface of said hypocledium shortly after the limbs of the wishbone are cut through, the wishbone has had only a limited opportunity to move before the moment of separating the hypocledium from the meat adjacent to its inward facing surface. This makes that the wishbone is generally where it is expected to be, and the primary wishbone cutter engages the poultry carcass at the anatomically correct position adjacent to the inward facing surface of the hypocledium. This already improves the situation relative to the device and method of WO2011/068402.

It is noted that it is not necessary for the first aspect of the invention that the wishbone is or becomes entirely separated from the remainder of the poultry carcass. In some markets, e.g. in the Italian market, there is a demand for poultry carcasses that still contain the wishbone. For those markets, a wishbone that is still present in the poultry carcass but is relatively easy to remove therefrom makes an attractive product. Using the device and/or method according to the first aspect of the invention can provide such a product.

In a possible embodiment, the primary wishbone cutter comprises a primary wishbone knife, which comprises the front cutter portion and the wishbone limb cutter portion.

As the front cutter portion and the wishbone limb cutter portion are provided in a single element, i.e. the primary wishbone knife, they have a fixed position relative to each other. This provides a simple, strong and generally reliable embodiment.

In an alternative embodiment, the primary wishbone cutter comprises a front cutter knife which comprises the front cutter portion of the primary wishbone cutter, and a wishbone limb cutter knife which comprises the wishbone limb cutter portion of the primary wishbone cutter.

So, in this embodiment, the front cutter portion and the wishbone limb cutter portion are arranged on separate elements. This allows the timing of the cutting actions of the front cutter portion and the wishbone limb cutter portion to be controlled relative to each other in a variable way, e.g. depending on the size of the poultry carcass.

In a possible embodiment, the poultry carcass further comprises a neck opening and the primary wishbone cutter is moveable between a first position outside the poultry carcass and a second position in which the front cutter portion and the wishbone limb cutter portion are inside the poultry carcass, and the front cutter portion and the wishbone limb cutter portion are adapted to be introduced into the poultry carcass via the neck opening.

In this embodiment, the direction of movement from the first position to the second position is the cutting direction.

This embodiment provides a generally suitable way of carrying out the invention.

In a possible embodiment, the wishbone separator device further comprises a secondary wishbone cutter. The secondary wishbone cutter comprises two secondary wishbone knives, each adapted for separating the wishbone from meat that is present on the outside of a limb of the wishbone. Each of the secondary wishbone knives is moveable between a first position (i.e. a first position of the secondary wishbone knife, which can be different from the first position of the primary wishbone cutter), in which said secondary wishbone knife is outside the poultry carcass and a second position (i.e. a second position of the secondary wishbone knife, which can be different from the second position of the primary wishbone cutter), in which said secondary wishbone knife is arranged inside the poultry carcass, adjacent to the wishbone and outside of the limb of the wishbone. Optionally, the secondary wishbone knives together sever the hypocledial ligament.

"Outside of the limb of the wishbone" means outside the area between the limbs of the wishbone.

This embodiment allows to separate the wishbone from the poultry carcass entirely.

In this embodiment, the device according to the first aspect of the invention can be used in generally the same way as the device described in WO2011/068402 and the device of EP1430780A1. For example, the wishbone can be removed from the poultry carcass by withdrawing the primary wishbone cutter and the secondary wishbone knives simultaneously from their respective second position, with the wishbone being present between the primary wishbone cutter and the secondary wishbone knives.

Optionally, in this embodiment additionally a wishbone support block is provided, of the type that is described in WO2011/068402 and EP1430780A1.

Optionally, the secondary wishbone knives each follow a secondary cutting path that extends between the first position, in which said secondary wishbone knife is outside the poultry carcass and the second position, in which said secondary wishbone knife is arranged inside the poultry carcass, adjacent to the wishbone and outside of the leg of the wishbone. Optionally, the secondary cutting paths have a curved shape that substantially follows the outer contour of the wishbone as is described in WO2011/068402.

In a possible combined embodiment, the poultry carcass further comprises a neck opening and the primary wishbone cutter is moveable between a first position outside the poultry carcass and a second position in which the front cutter portion and the wishbone limb cutter portion are inside the poultry carcass, and the front cutter portion and the wishbone limb cutter portion are adapted to be introduced into the poultry carcass via the neck opening. In this embodiment, the direction of movement from the first position to the second position is the cutting direction.

In addition, in this combined embodiment the wishbone separator device further comprises a secondary wishbone cutter. The secondary wishbone cutter comprises two secondary wishbone knives, each adapted for separating the wishbone from meat that is present on the outside of a limb of the wishbone. Each of the secondary wishbone knives is moveable between a first position (i.e. a first position of the secondary wishbone knife, which can be different from the first position of the primary wishbone cutter), in which said secondary wishbone knife is outside the poultry carcass and a second position (i.e. a second position of the secondary wishbone knife, which can be different from the second position of the primary wishbone cutter), in which said secondary wishbone knife is arranged inside the poultry carcass, adjacent to the wishbone and outside of the limb of the wishbone.

In this combined embodiment, optionally, when the primary wishbone cutter is in its second position and the two secondary wishbone knives are in their respective second positions, at least a part of the left limb cutting edge is at a distance from the secondary wishbone knife that is adjacent to the left limb cutting edge, and at least a part of the right limb cutting edge is at a distance from the secondary wishbone knife that is adjacent to the right limb cutting edge.

For example, this distance is at least 3 millimeter, optionally at least 5 millimeter.

In a possible embodiment, the wishbone separator device further comprises a wishbone cutter actuator which is adapted to move the primary wishbone cutter in the cutting direction.

In a possible combined embodiment, the wishbone separator device comprises a wishbone cutter actuator which is adapted to move the primary wishbone cutter in the cutting direction. In this combined embodiment, the wishbone separator device further comprises a secondary wishbone cutter.

The secondary wishbone cutter comprises two secondary wishbone knives, each adapted for separating the wishbone from meat that is present on the outside of a limb of the wishbone. Each of the secondary wishbone knives is moveable between a first position (i.e. a first position of the secondary wishbone knife, which can be different from the first position of the primary wishbone cutter), in which said secondary wishbone knife is outside the poultry carcass and a second position (i.e. a second position of the secondary wishbone knife, which can be different from the second position of the primary wishbone cutter), in which said secondary wishbone knife is arranged inside the poultry carcass, adjacent to the wishbone and outside of the limb of the wishbone.

Optionally, in this combined embodiment, the wishbone cutter actuator is adapted to move the primary wishbone cutter from its first position to its second position and vice versa, and the wishbone cutter actuator is further adapted to move both secondary wishbone knives from their respective first position to their respective second position and vice versa. In this embodiment, optionally the wishbone cutter actuator comprises a single driver, e.g. a single pneumatic cylinder. This can for example be achieved by mounting the primary wishbone cutter and the secondary wishbone cutter together on a moveable mounting block.

In a possible combined embodiment, the primary wishbone cutter comprises a front cutter knife which comprises the front cutter portion of the primary wishbone cutter, and a wishbone limb cutter knife which comprises the wishbone limb cutter portion of the primary wishbone cutter.

In this combined embodiment, the wishbone separator device further comprises a wishbone cutter actuator which is adapted to move the primary wishbone cutter in the cutting direction.

Optionally, in this combined embodiment the wishbone cutter actuator comprises a front cutter knife driver and a wishbone limb cutter knife driver. This arrangement allows to vary the timing between the movement of the front cutter knife and the wishbone limb cutter knife, and therewith of the front cutter portion and of the wishbone limb cutter portion, relative to each other. This can for example be useful to match this timing to varying sizes of the poultry carcasses to be processed.

Alternatively, in this combined embodiment, the wishbone cutter actuator comprises a single primary wishbone cutter driver which is adapted to move the front cutter knife as well as the wishbone limb cutter knife. This results in a less complicated construction. This embodiment optionally comprises a coupling device that is arranged between the wishbone cutter actuator on the one hand and the front cutter knife and the wishbone limb cutter knife on the other. Such a coupling device can be designed for example to make that the front cutter knife stops moving after separating the hypocledium from the meat adjacent to the inward facing surface of the hypocledium, while the wishbone limb cutter still moves forward in the cutting direction to reach the limbs of the wishbone, or to make that the wishbone limb cutter knife stops moving after cutting through the limbs of the wishbone, while the front cutter knife still moves forward in the cutting direction to reach the hypocledium and the meat adjacent to the inward facing surface of the hypocledium.

In a possible embodiment the left front cutting edge and the right front cutting edge enclose a front cutting angle and the left limb cutting edge and the right limb cutting edge enclose a limb cutting angle, and the front cutting angle is larger than or equal to the limb cutting angle.

In a possible embodiment, a system for separating the wishbone from a poultry carcass is provided, which comprises a device according to the invention, and a poultry carcass conveyor system, which comprises a plurality of product carriers that are adapted to receive a poultry carcass, which carriers are moveable along a track. The device according to the first aspect of the invention is in this system arranged along said track. Optionally, other types of processing devices, e.g. a device for harvesting breast meat and/or a device for harvesting back meat, are arranged along the track as well.

In a possible embodiment, the first aspect of the invention can be applied in a wishbone separator system, which comprises a plurality of wishbone separator devices according to the first aspect of the invention, which wishbone separator devices are arranged in a carrousel.

A carrousel may comprise a workstation frame that is rotatable about a central axis. The devices according to the first aspect of the invention can be mounted to the rotatable workstation frame, so that they rotate with this workstation frame about the central axis.

Carrousel machines can be used in combination with a poultry carcass conveyor system, which comprises poultry carcass carriers which are adapted to move the poultry carcasses to be processed along a path. The carrousel is arranged along this path, and the path extends along a part of the circumference of the carrousel. The conveying speed at which the poultry carcass conveyor system moves the poultry carcasses (which are held by the carriers) along the path and the rotational speed of the carrousel are matched with each other, so that the poultry carcasses do not move relative to the device according to the first aspect of the invention that is mounted to the workstation frame and that processes said poultry carcass, at least over a part of the length of the path that extends along the circumference of the carrousel. Of course, it is likewise possible to arrange a device according to the second aspect or a device in which the first and second aspect of the invention are combined in such a system with a carrousel and a poultry carcass conveyor system.

The first aspect of the invention also provides a method for separating a wishbone from a poultry carcass, which poultry carcass comprises a neck opening, a breastbone and a wishbone having a hypocledium and two limbs, said hypocledium having an inward facing surface, said method comprising the following steps:
moving the primary wishbone cutter of a wishbone separator device in accordance with the first aspect of the invention in a cutting direction from a first position, which is located outside the poultry carcass, towards a second position in which the front cutter portion and the wishbone limb cutter portion is arranged inside the poultry carcass,
thereby introducing the primary wishbone cutter into the poultry carcass via the neck opening,
during the movement of the primary wishbone cutter from the first position to the second position, cutting though the limbs of the wishbone and separates the hypocledium from meat that is present adjacent to the inward facing surface of the hypocledium,
wherein the cutting through of the limbs of the wishbone occurs at the same time or after the separation of the hypocledium from the meat that is present adjacent to the inward facing surface of the hypocledium.

In an alternative approach to the same inventive concept, the first aspect of the invention additionally provides a method for separating a wishbone from a poultry carcass, which poultry carcass comprises a neck opening, a breastbone and a wishbone having a hypocledium and two limbs, said hypocledium having an inward facing surface, said method comprising the following steps:
moving the primary wishbone cutter of a wishbone separator device in accordance with the first aspect of the invention in a cutting direction from a first position, which is located outside the poultry carcass, towards a second position in which the front cutter portion and the wishbone limb cutter portion is arranged inside the poultry carcass,
thereby introducing the primary wishbone cutter into the poultry carcass via the neck opening,
during the movement of the primary wishbone cutter from the first position to the second position, cutting though the limbs of the wishbone and separating the hypocledium from meat that is present adjacent to the inward facing surface of the hypocledium,
wherein the cutting through of the limbs of the wishbone occurs before the separation of the hypocledium from the meat that is present adjacent to the inward facing surface of the hypocledium, wherein the distance from the central front apex of the front cutter portion to the hypocledium at the moment of cutting through the limbs of the wishbone is less than 10 mm, preferably less than 5 mm.

As is explained earlier in this document, both approaches provide an improvement of the method and device that is described in WO2011/068402.

In a possible embodiment of the method according to the first aspect of the invention, an embodiment of the wishbone separator device according to the first aspect of the invention is used wherein the wishbone separator device further comprises a secondary wishbone cutter, which secondary wishbone cutter comprises two secondary wishbone knives, each adapted for separating the wishbone from meat that is present on the outside of a limb of the wishbone, each of said secondary wishbone knives being moveable between a first position, in which said secondary wishbone knife is outside the poultry carcass and a second position, in which said secondary wishbone knife is arranged inside the poultry carcass, adjacent to the wishbone and outside of the limb of the wishbone. In this embodiment, the method further comprises the step of moving the secondary wishbone knives of said embodiment of the wishbone separator device from their respective first position, which is located outside the poultry carcass towards their respective second position in which said secondary wishbone knife is arranged inside the poultry carcass.

In a possible embodiment of the method according to the first aspect of the invention, an embodiment of the wishbone separator device is used wherein the primary wishbone cutter comprises a front cutter knife which comprises the front cutter portion of the primary wishbone cutter, and a wishbone limb cutter knife which comprises the wishbone limb cutter portion of the primary wishbone cutter. In this embodiment, the step of moving the primary wishbone cutter in a cutting direction from a first position, which is located outside the poultry carcass, towards a second position in which front cutter portion and the wishbone limb cutter portion is arranged inside the poultry carcass involves:

moving the front cutter knife of said embodiment of the wishbone separator device from a position outside the poultry carcass to a position inside the poultry carcass, thereby separating the hypocledium from meat that is present adjacent to the inward facing surface of the hypocledium by the front cutter portion of the front cutter knife, and moving the wishbone limb cutter knife wishbone separator device of said embodiment of the wishbone separator device from a position outside the poultry carcass to a position inside the poultry carcass, thereby cutting through the limbs of the wishbone by the wishbone limb cutter portion of the wishbone limb cutter knife.

Optionally, in this embodiment, the front cutter knife is moved by a front cutter driver and the wishbone limb cutter knife is moved by a wishbone limb cutter driver.

Alternatively, in this embodiment, an embodiment of the wishbone separator device is used wherein the wishbone separator device further comprises a wishbone cutter actuator which is adapted to move the primary wishbone cutter in the cutting direction and wherein the wishbone cutter actuator comprises a single primary wishbone cutter driver which is adapted to move the front cutter knife as well as the wishbone limb cutter knife, and the front cutter knife and the wishbone limb cutter knife both are moved by the single primary wishbone cutter driver of the wishbone cutter actuator of said embodiment of the wishbone separator device.

The first aspect of the invention also pertains to a wishbone knife, which is adapted for use in a wishbone separator device according to the first aspect of the invention, or in a wishbone separator device in which the first aspect of the invention and the second aspect of the invention have been combined.

The wishbone knife according to the first aspect of the invention comprises:

a substantially triangular front cutter portion which is adapted to separate the hypocledium from meat that is present adjacent to the inward facing surface of the hypocledium, which front cutter portion comprises a central front apex that points in the cutting direction and a left front cutting edge and a right front cutting edge, which left front cutting edge and right front cutting edge diverge from said central front apex, a substantially triangular wishbone limb cutter portion which is adapted to cut through the limbs of the wishbone, which wishbone limb cutter portion comprises a left limb cutting edge and a right limb cutting edge, wherein an intersection point of an imaginary extension line of the left limb cutting edge and an imaginary extension line of the right limb cutting edge is arranged on an imaginary center line that extends in forward and rearward direction parallel to the cutting direction through the central front apex of the front cutter portion, and wherein the left front cutting edge is arranged forward of the left limb cutting edge as seen in the cutting direction and outward relative to said imaginary extension line from the left limb cutting edge and the right front cutting edge is arranged forward of the right limb cutting edge as seen in the cutting direction and outward relative to said imaginary extension line from the right limb cutting edge.

Optionally, in the wishbone knife according to the first aspect of the invention, the left front cutting edge and the right front cutting edge enclose a front cutting angle and the left limb cutting edge and the right limb cutting edge enclose a limb cutting angle, and the front cutting angle is larger than or equal to the limb cutting angle.

In a second aspect, the object of the invention is achieved by a wishbone separator device for separating a wishbone from a poultry carcass, said wishbone comprising a hypocledium and two limbs, said hypocledium having an inward facing surface, which device comprises:

a primary wishbone cutter, which is adapted to cut through the limbs of the wishbone and to separate the hypocledium from meat that is present adjacent to the inward facing surface of the hypocledium, a secondary wishbone cutter which comprises:

two secondary wishbone knives, each adapted for separating the wishbone from meat that is present on the outside of a limb of the wishbone, and a secondary wishbone knives actuator assembly, the secondary wishbone knives actuator assembly being adapted to prescribe a secondary cutting path for each of the secondary wishbone knives relative to the poultry carcass, each of said secondary cutting paths extending between a first position, in which said secondary wishbone knife is outside the poultry carcass and a second position, in which said secondary wishbone knife is arranged inside the poultry carcass, adjacent to the wishbone and outside of the limb of the wishbone, wherein the secondary wishbone knives actuator assembly has a small carcass mode and a large carcass mode, wherein the secondary cutting path that is prescribed when the secondary wishbone knives actuator assembly is in the small carcass mode differs from the secondary cutting path that is prescribed when the secondary wishbone knives actuator assembly is in the large carcass mode.

The second aspect of the invention also provides an improvement of the method and device as described in WO2011/068402.

In WO2011/068402, the secondary wishbone knives follow a curved path so that they can follow the outer contour of the wishbone when they separate the wishbone from the meat the is present on the outside of the limbs of the wishbone. "Outside of the limb of the wishbone" means outside the area between the limbs of the wishbone.

But when using the device and/or method of WO2011/068402, still sometimes bone splinters are found in the breast meat.

In accordance with the second aspect of the invention, in order to solve this problem, the secondary wishbone knives actuator assembly has been provided with a small carcass mode and a large carcass mode. The secondary cutting path that is prescribed when the secondary wishbone knives actuator assembly is in the small carcass mode differs from the secondary cutting path that is prescribed when the secondary wishbone knives actuator assembly is in the large carcass mode.

Optionally, the secondary cutting path that is associated with the small carcass mode and/or the secondary cutting path that is associated with the large carcass mode is curved. This is however not necessary.

In a possible embodiment, wherein the primary wishbone cutter is moveable between a first position outside the poultry carcass and a second position inside the poultry carcass.

In a possible embodiment, the second position of the secondary wishbone knives is the same in the small carcass mode and in the large carcass mode. So, the secondary cutting path that is associated with the small carcass mode and/or the secondary cutting path that is associated with the large carcass mode both use the same second position as one end point.

Surprisingly, it was found that this embodiment still offers good results in view of the desired reduction of bone splinters in the breast meat. An advantage of this embodiment is that no or limited further adjustments to the wishbone separator device have to be made when the secondary wishbone knives actuator assembly is switched from small carcass mode to large carcass mode or vice versa.

This embodiment is in particular advantageous in combination with the embodiment in which the primary wishbone cutter is moveable between a first position outside the poultry carcass and a second position inside the poultry carcass. In that case, the second position of the primary wishbone cutter does not have to be changed when the secondary wishbone knives actuator assembly is switched from small carcass mode to large carcass mode or vice versa when the second position of the secondary wishbone knives is the same in the small carcass mode and in the large carcass mode.

In a possible embodiment, the secondary wishbone knives actuator assembly comprises two cam tracks, each associated with a secondary wishbone knife, and the relative position of the cam tracks in the small carcass mode differs from the relative position of the cam tracks in the large carcass mode.

In this embodiment, the shape of the secondary cutting paths is the same in the small carcass mode and in the large carcass mode, but the paths are moved relative to each other and also relative to the poultry carcass. The secondary wishbone knives follow a secondary cutting path at a different position, but the shape of the secondary cutting paths is the same. For example, the distance between the secondary cutting paths in the large carcass mode is larger that the distance between the secondary cutting paths in the small carcass mode.

In a possible embodiment, the wishbone separator device according to the second aspect of the invention further comprises a frame, and the primary wishbone cutter and the secondary wishbone knives are mounted on a moveable mounting block. The secondary wishbone knives actuator assembly is adapted to move said mounting block relative to the frame when the secondary wishbone knives are moved from their respective first position to their respective second position or vice versa.

In a possible combined embodiment, the secondary wishbone knives actuator assembly comprises two cam tracks, each associated with a secondary wishbone knife, and the relative position of the cam tracks in the small carcass mode differs from the relative position of the cam tracks in the large carcass mode and the wishbone separator device according to the second aspect of the invention further comprises a frame, and the primary wishbone cutter and the secondary wishbone knives are mounted on a moveable mounting block. The secondary wishbone knives actuator assembly is adapted to move said mounting block relative to the frame when the secondary wishbone knives are moved from their respective first position to their respective second position or vice versa.

Optionally, in this combined embodiment, the secondary wishbone knives are pivotably mounted to the mounting block and the secondary wishbone knives actuator assembly is adapted to move the mounting block relative to the cam tracks when the secondary wishbone knives are moved from their respective first position to their respective second position or vice versa.

In a possible embodiment in which the secondary wishbone knives actuator assembly comprises two cam tracks, each associated with a secondary wishbone knife, and the relative position of the cam tracks in the small carcass mode differs from the relative position of the cam tracks in the large carcass mode, the wishbone separator device further comprises a frame. In this embodiment, the cam tracks are moveably, e.g. pivotably, connected to said frame, and wherein the position of the cam tracks relative to said frame in the small carcass mode differs from the position of the cam tracks relative to said frame in the large carcass mode.

Optionally, in this embodiment, the secondary wishbone knives actuator assembly comprises a cam track adjuster which is adapted to shift the position of the cam tracks relative to the frame from the position associated with the small carcass mode to the position associated with the large carcass mode and/or vice versa. The cam track adjuster comprises for example a cylinder, e.g. a pneumatic cylinder.

It is possible to combine the first aspect of the invention and the second aspect of the invention in a wishbone separator device for separating the wishbone from a poultry carcass.

This results in a wishbone separator device for separating a wishbone from a poultry carcass, said wishbone comprising a hypocledium and two limbs, said hypocledium comprising an inward facing surface,
  which wishbone separator device comprises:
  a primary wishbone cutter, which is moveable in a cutting direction,
  which primary wishbone cutter comprises:
  a substantially triangular front cutter portion which is adapted to separate the hypocledium from meat that is present adjacent to the inward facing surface of the hypocledium, which front cutter portion comprises a central front apex that points in the cutting direction and a left front cutting edge and a right front cutting edge, which left front cutting edge and right front cutting edge diverge from said central front apex,
  a substantially triangular wishbone limb cutter portion which is adapted to cut through the limbs of the wishbone, which wishbone limb cutter portion comprises a left limb cutting edge and a right limb cutting edge,
wherein an intersection point of an imaginary extension line of the left limb cutting edge and an imaginary extension line of the right limb cutting edge is arranged on an imaginary center line that extends in forward and rearward direction parallel to the cutting direction through the central front apex of the front cutter portion, and
wherein the left front cutting edge is arranged forward of the left limb cutting edge as seen in the cutting direction and outward relative to said imaginary extension line from the left limb cutting edge and the right front cutting edge is arranged forward of the right limb cutting edge as seen in the cutting direction and outward relative to said imaginary extension line from the right limb cutting edge, wherein said wishbone separator device further comprises a secondary wishbone cutter which comprises:

two secondary wishbone knives, each adapted for separating the wishbone from meat that is present on the outside of a limb of the wishbone, and a secondary wishbone knives actuator assembly, the secondary wishbone knives actuator assembly being adapted to prescribe a secondary cutting path for each of the secondary wishbone knives relative to the poultry carcass, each of said secondary cutting paths extending between a first position, in which said secondary wishbone knife is outside the poultry carcass and a second position, in which said secondary wishbone knife is arranged inside the poultry carcass, adjacent to the wishbone and outside of the limb of the wishbone, wherein the secondary wishbone knives actuator assembly has a small carcass mode and a large carcass mode, wherein the secondary cutting path that is prescribed when the secondary wishbone knives actuator assembly is in the small carcass mode differs from the secondary cutting path that is prescribed when the secondary wishbone knives actuator assembly is in the large carcass mode.

It is also possible to combine one or more disclosed embodiments of the first aspect of the invention with one or more disclosed embodiments of the second aspect of the invention.

BRIEF DESCRIPTION OF THE FIGURES

The invention will be described in more detail below under reference to the drawing, in which in a non-limiting manner exemplary embodiments of the invention will be shown.

The drawing in:

FIG. 7: illustrates the known method for separating the wishbone from a poultry carcass using a known primary wishbone knife, FIG. 8: illustrates an embodiment of the method according to the first aspect of the invention.

DETAILED DESCRIPTION OF THE INVENTION

Figure 1:
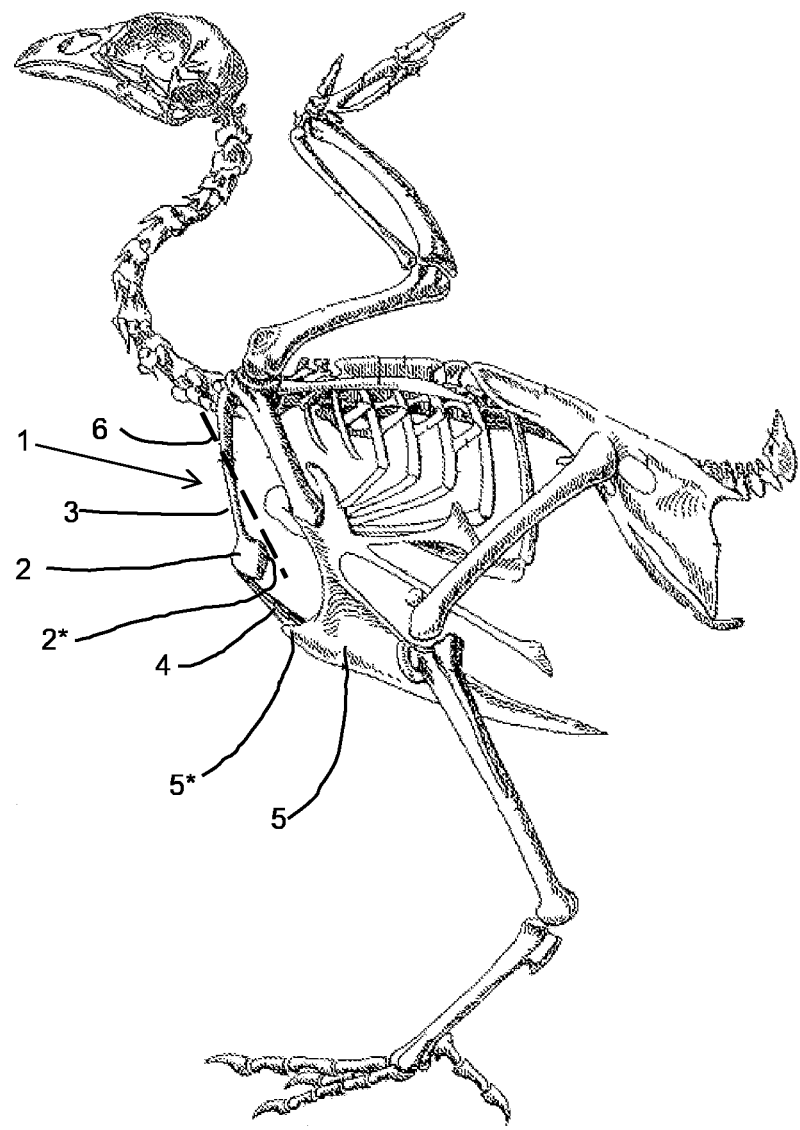
FIG. 1: illustrates schematically the skeleton of a chicken and the cut that is made by the primary wishbone cutter.

FIG. 1 illustrates schematically the skeleton of a chicken and the cut that is made by the primary wishbone cutter the cut that is made by the primary wishbone cutter. Wishbone 1 comprises a tip, which in scientific terms is known as the hypocledium 2, and two limbs 3 (only one of them shown in FIG. 1 as FIG. 1 is a side view). The hypocledium 2 comprises an inward facing surface 2*.

FIG. 1 also illustrates schematically the breastbone (sternum) 5 and the tip of the breastbone, which in scientific terms is known as the carinal apex 5* of the sternum 5. Between the carinal apex 5* of the sternum 5 and the hypocledum 2, hypocledial ligament 4 extends.

Dashed line 6 in FIG. 1 indicates that trajectory that is followed by the primary cutter relative to the poultry carcass. FIG. 1 shows that the primary wishbone cutter cuts through the limbs 3 of the wishbone 1 and separates the inward facing surface 2* of the hypocledium 2 from the meat adjacent to it.

Figure 2:
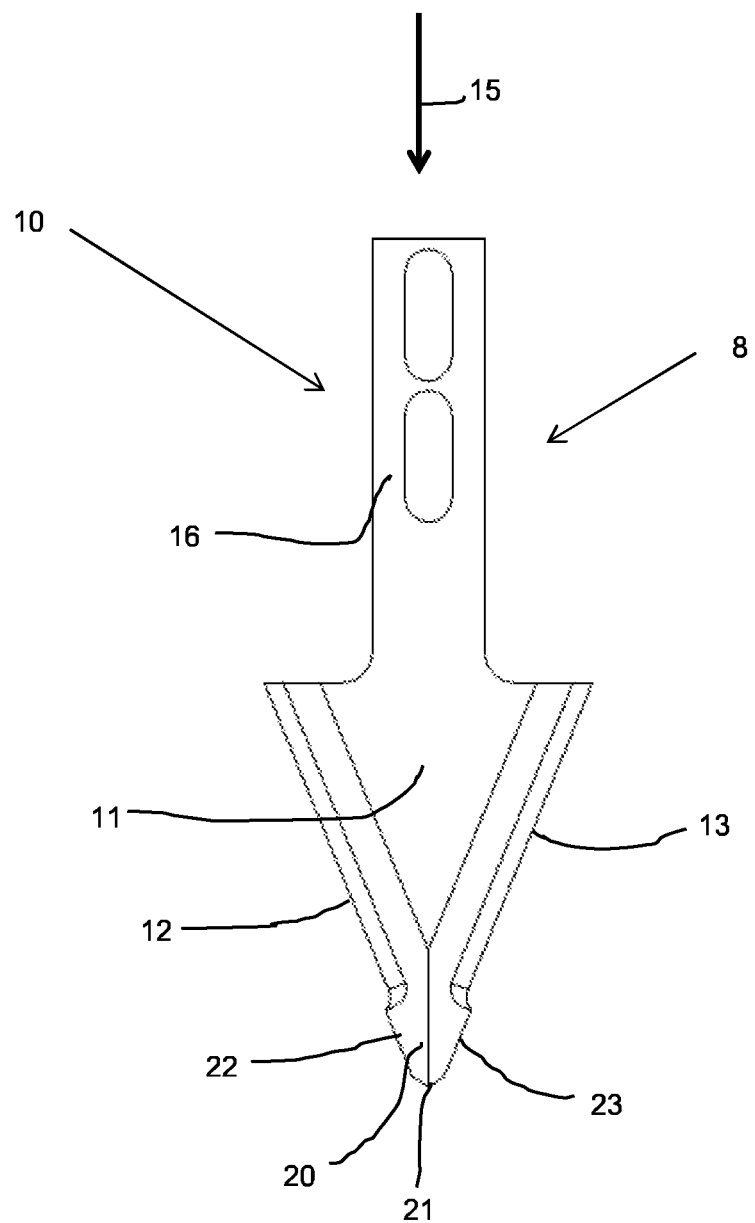
FIG. 2: illustrates a first embodiment of a primary wishbone cutter according to the first aspect of the invention.

FIG. 2 schematically illustrates a first embodiment of a primary wishbone cutter 8 according to the first aspect of the invention.

In the embodiment of FIG. 2, the primary wishbone cutter 8 comprises a primary wishbone knife 10.

The primary wishbone knife 10 is moveable in cutting direction 15. It comprises a mounting element 16 which allows it to be mounted in the wishbone separator device according to the first aspect of the invention.

In the embodiment shown in FIG. 2, the primary wishbone knife 10 comprises a front cutter portion 20. The front cutter portion 20 has substantially triangular shape and is adapted to separate the hypocledium 2 from meat that is present adjacent to the inward facing surface 2* of the hypocledium 2.

The front cutter portion 20 comprises a central front apex 21 that points in the cutting direction 15. In the embodiment of FIG. 2, the central front apex 21 is tapered or rounded, but this is not necessary.

The front cutter portion 20 further comprises a left front cutting edge 22 and a right front cutting edge 23. As can be seen in FIG. 2, the left front cutting edge 22 and the right front cutting edge 23 diverge from the central front apex 21. The left front cutting edge 22 and the right front cutting edge 23 have a straight part in this embodiment.

In the embodiment shown in FIG. 2, the primary wishbone knife 10 further comprises a wishbone limb cutter portion 11. The wishbone limb cutter portion 11 has substantially triangular shape and is adapted to cut through the limbs 3 of the wishbone 1.

The wishbone limb cutter portion 11 comprises a left limb cutting edge 12 and a right limb cutting edge 13, which in this embodiment are straight cutting edges.

Figure 3:
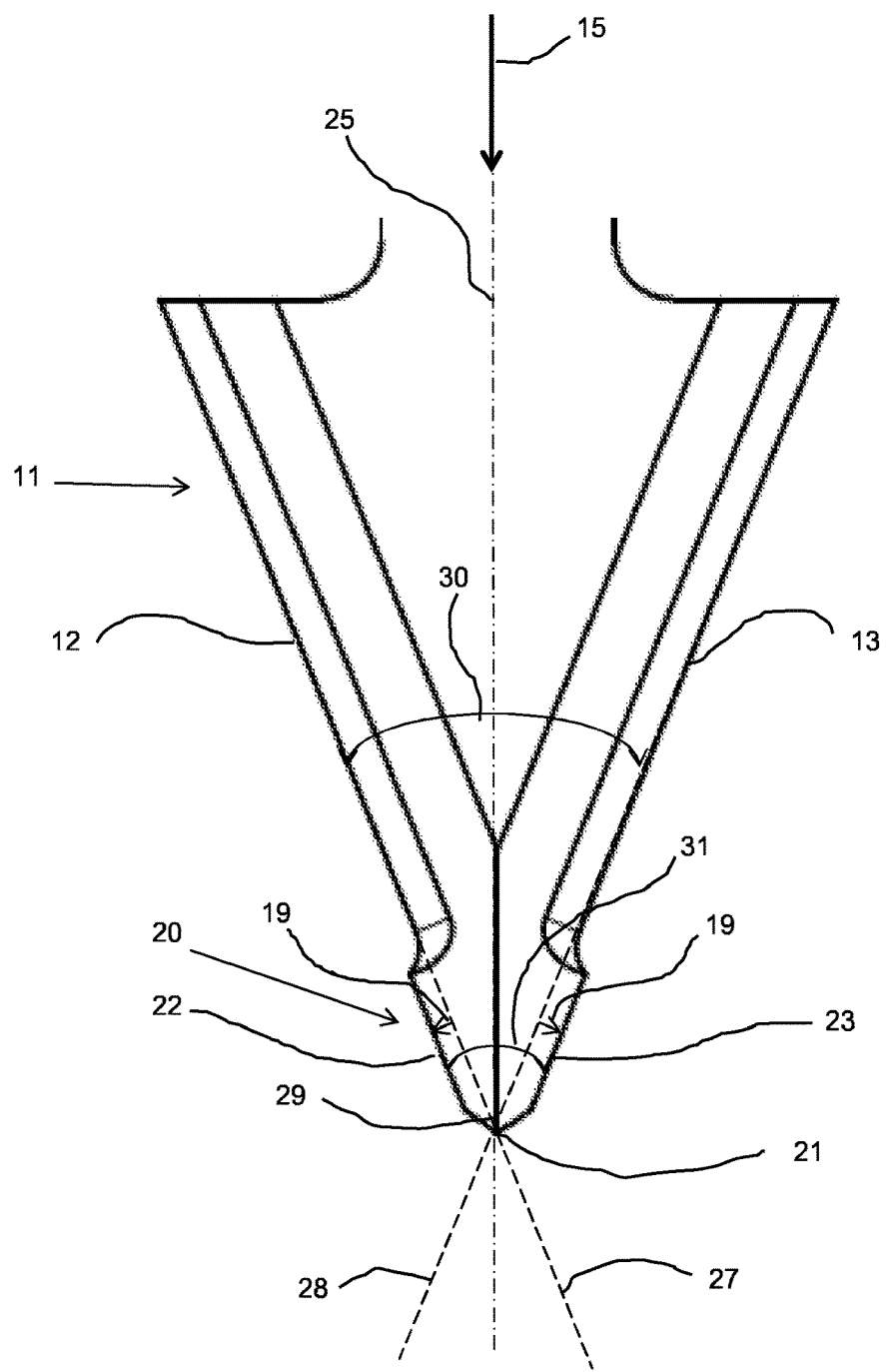
FIG. 3: illustrates the front cutter portion and the wishbone limb cutter portion of the embodiment of FIG. 2 in more detail.

FIG. 3 shows the front cutter portion 20 and the wishbone limb cutter portion 11 of the embodiment of FIG. 2 in more detail.

FIG. 3 shows imaginary center line 25 that extends in forward and rearward direction parallel to the cutting direction 15 through the central front apex 21 of the front cutter portion 20. FIG. 3 also shows imaginary extension line 27 of the left limb cutting edge 12 and imaginary extension line 28 of the right limb cutting edge 13, and the intersection point 29 of the imaginary extension line 27 and the imaginary extension line 28, which is on the center line 25. In the example of FIG. 3, the intersection point 29 almost coincides with the central front apex 21, but this is not necessary.

FIG. 3 shows that the left front cutting edge 22 is arranged forward of the left limb cutting edge 12 as seen in the cutting direction 15 and outward relative to the imaginary extension line 27 from the left limb cutting edge 22, "outward" being indicated by arrow 19 and meaning away from the area between the parts of imaginary cutting lines 27, 28 between the left and right limb cutting edge 12,13 and the intersection point 29.

FIG. 3 also shows that the right front cutting edge 23 is arranged forward of the right limb cutting edge 13 as seen in the cutting direction 15 and outward relative to the imaginary extension line 28 from the right limb cutting edge 13, "outward" being indicated by arrow 19 and meaning away from the area between the parts of imaginary cutting lines 27, 28 between the left and right limb cutting edge 12, 13 and the intersection point 29.

FIG. 3 also shows that the left front cutting edge 22 and the right front cutting edge 23 enclose a front cutting angle 31 and the left limb cutting edge 12 and the right limb cutting edge 13 enclose a limb cutting angle 30, wherein the front cutting angle 31 is larger than or equal to the limb cutting angle 30.

Figure 4:
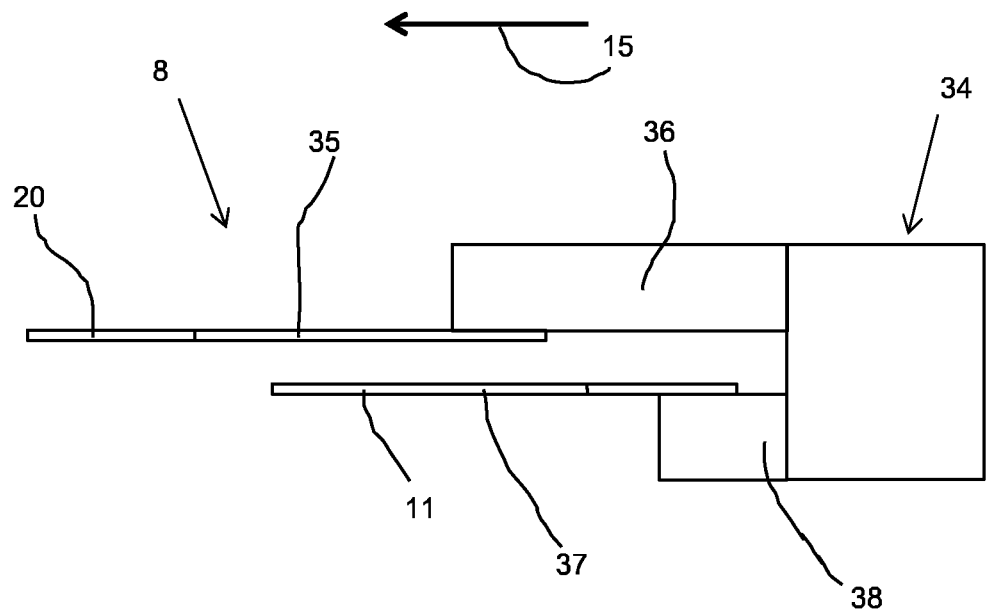
FIG. 4: illustrates a second embodiment of a primary wishbone cutter in accordance with the first aspect of the invention.

FIG. 4 shows a second embodiment of a primary wishbone cutter 8 in accordance with the first aspect of the invention. Arrow 15 again indicates the cutting direction.

In the embodiment of FIG. 4, the primary wishbone cutter 8 comprises a front cutter knife 35 which comprises the front cutter portion 20 of the primary wishbone cutter 8 and a wishbone limb cutter knife 37 which comprises the wishbone limb cutter portion 11 of the primary wishbone cutter 8.

The embodiment of FIG. 4 further comprises a wishbone cutter actuator 34. In this embodiment, the wishbone cutter actuator 34 comprises a front cutter knife driver 36 and a wishbone limb cutter knife driver 38, which optionally can be operated independently from one another.

Figure 5:
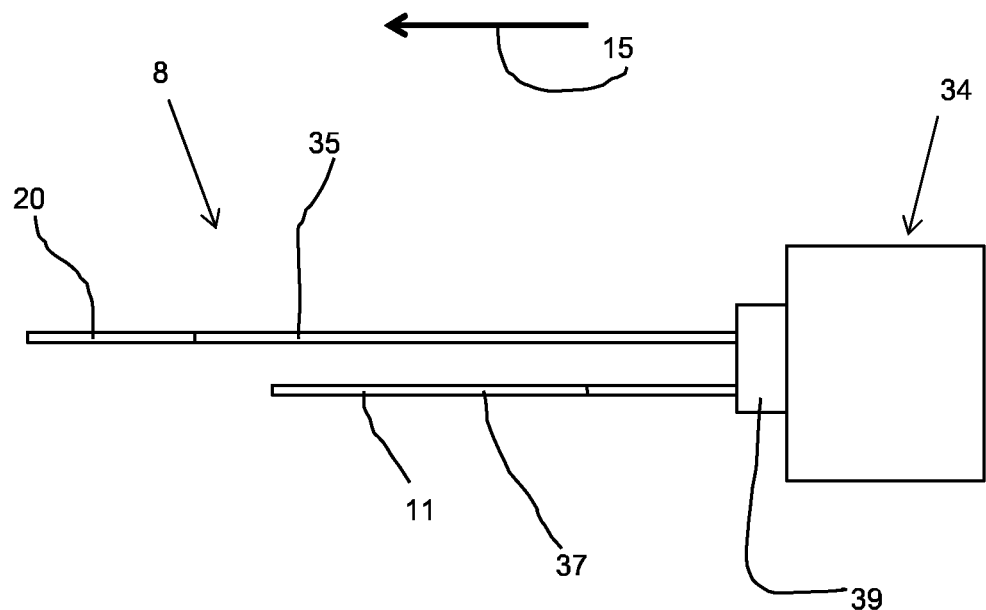
FIG. 5: illustrates a variant of the embodiment of FIG. 4, FIG. 6: illustrates an embodiment of a system for separating the wishbone from a poultry carcass, which comprises a device according to the invention.

FIG. 5 shows a variant of the embodiment of FIG. 4.

In this embodiment, again the primary wishbone cutter 8 comprises a front cutter knife 35 which comprises the front cutter portion 20 of the primary wishbone cutter 8 and a wishbone limb cutter knife 37 which comprises the wishbone limb cutter portion 11 of the primary wishbone cutter 8.

The embodiment of FIG. 5 further comprises a wishbone cutter actuator 34. However, in this variant, the wishbone cutter actuator 34 comprises a single primary wishbone cutter driver 39 which is adapted to move the front cutter knife 35 as well as the wishbone limb cutter knife 37.

Figure 6:
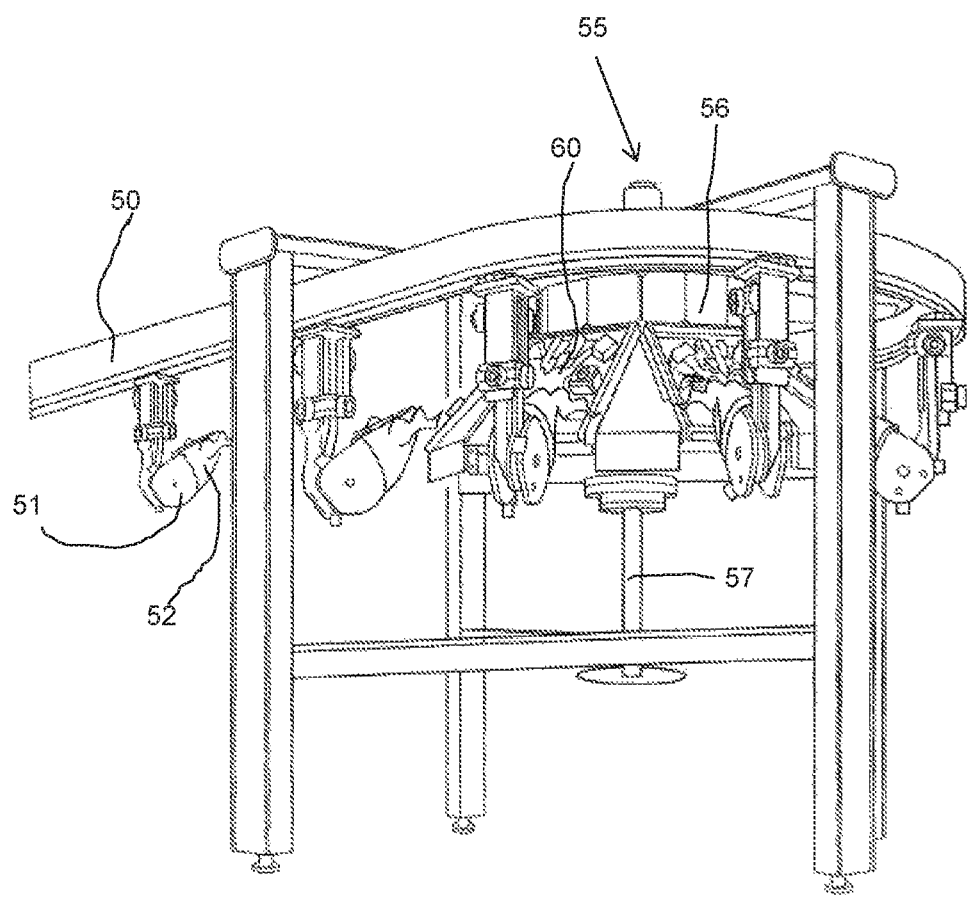

FIG. 6 shows an embodiment of a system for separating the wishbone from a poultry carcass, which comprises a device 60 according to the invention.

The device 60 according to the invention can be a device according to the first aspect of the invention, a device according to the second aspect of the invention, or a device in which the first aspect and the second aspect of the invention are combined.

The wishbone separator system as shown in FIG. 6 comprises a poultry carcass conveyor system, which comprises a plurality of product carriers 51 that are adapted to receive a poultry carcass 52, which carriers are moveable along a track 50. The device 60 according to the invention is in this system arranged along said track 50. Optionally, other types of processing devices, e.g. a device for harvesting breast meat and/or a device for harvesting back meat, are arranged along the track 50 as well.

In the embodiment which is shown in FIG. 6, a plurality of devices 60 according to the invention is arranged in a carrousel 55. The carrousel 55 of FIG. 6 comprises a workstation frame 56 that is rotatable about a central axis 57. The devices 60 according to the invention are to the rotatable workstation frame 56, so that they rotate with this workstation frame 56 about the central axis 57.

The carrousel 55 is arranged along the track 50 of the poultry carcass conveyor system, and the track 50 extends along a part of the circumference of the carrousel 55. The conveying speed at which the poultry carcass conveyor system moves the poultry carcass 52 (which are held by the carriers 51) along the track 50 and the rotational speed of the carrousel 55 are matched with each other, so that a poultry carcass 52 does not move relative to the device 60 according to the invention that is mounted to the workstation frame 56 and that processes said poultry carcass 52, at least of a part of the length of the track 50 that extends along the circumference of the carrousel 50.

FIG. 7 and FIG. 8 illustrate the method according to the first aspect in comparison with the prior art. FIGS. 7 and 8 schematically show the wishbone 1 with the hypocledium 2, the two limbs 3 and the hypocledial ligament 4 that is attached to the hypocledium 2. Arrow 15 again indicates the cutting direction.

FIG. 7 illustrates the known method for separating the wishbone from a poultry carcass using a primary wishbone knife 9, as is for example known from WO2011/068402 and EP1430780A1.

FIG. 7A shows the situation in which the known primary wishbone knife 9 has entered the poultry carcass, usually via the neck opening. The limbs 3 of the wishbone 1 are cut through before the front tip of the known primary wishbone knife 9 reaches the inward facing surface 2* of the hypocledium 2. At the moment of cutting through the limbs 2 of the wishbone 1, which moment is shown in FIG. 7A, the known primary wishbone knife 9 has still quite a long way to travel into the poultry carcass before it reaches the point where it can separate the hypocledium from the meat adjacent to the inward facing surface of the hypocledium 2.

FIG. 7B shows the moment in which the known primary wishbone knife 9 has reached the point where it has separated the hypocledium from the meat adjacent to the inward facing surface of the hypocledium 2.

FIG. 8 illustrates an embodiment of the method according to the first aspect of the invention, in which a device according to the first aspect of the invention is used. Arrow 15 again indicates the cutting direction.

FIG. 8A shows that by using a device according to the first aspect of the invention that comprises a primary wishbone cutter 8 in accordance with the invention, the hypocledium can be separated from the meat adjacent to the inward facing surface of the hypocledium 2 by the primary wishbone cutter 8 before the limbs 3 of the wishbone 1 are cut through.

FIG. 8B shows the moment at which the limbs 3 of the wishbone 1 are cut through.

Cutting the limbs 3 of the wishbone 1 through after separating the hypocledium from the meat adjacent to the inward facing surface of the hypocledium 2 has the advantage that the wishbone 1 is still generally in its natural position within the poultry carcass, which increases the accuracy of the action of separating the hypocledium from the meat that is present adjacent to the inward facing surface of the hypocledium.

Figure 9:
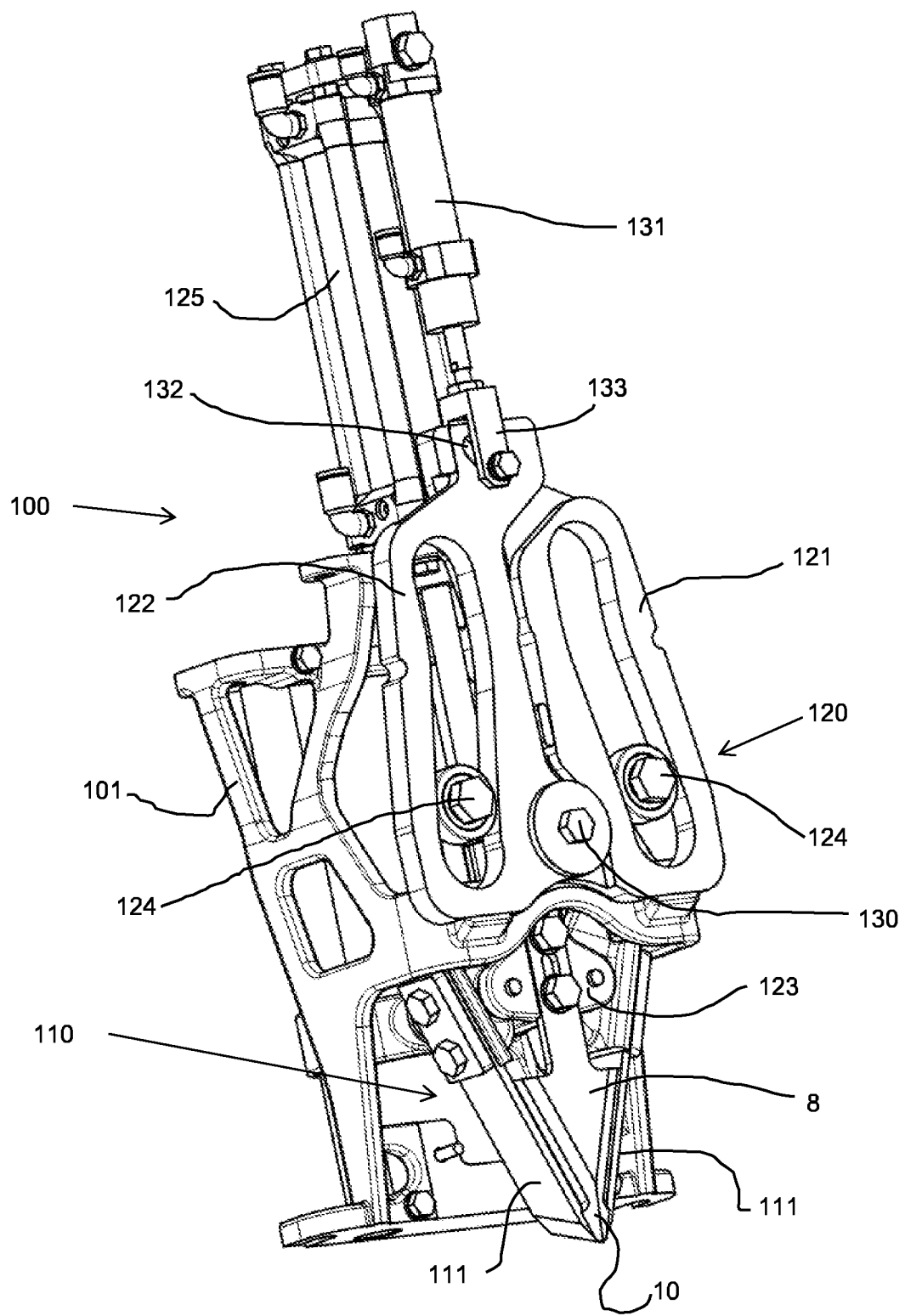
FIG. 9: illustrates a possible embodiment of a device in which the first aspect of the invention and the second aspect of the invention have been combined.

FIG. 9 shows a possible embodiment of a device 100 in which the first aspect of the invention and the second aspect of the invention have been combined, in perspective view.

FIG. 9 clearly shows the presence of primary wishbone cutter 8 according to the first aspect of the invention, here embodied in the form a primary wishbone knife 10.

The device 100 comprises a device frame 101 onto which the components of the device 100 are mounted.

The device 100 further comprises a secondary wishbone cutter 110. The secondary wishbone cutter 110 comprises two secondary wishbone knives 111, each adapted for separating the wishbone 1 from meat that is present on the outside of a limb 3 of the wishbone 1. The secondary wishbone cutter 110 further comprises a secondary wishbone knives actuator assembly 120.

The secondary wishbone knives actuator assembly 120 is adapted to prescribe a secondary cutting path for each of the secondary wishbone knives 111 relative to the poultry carcass. Each of the secondary cutting paths extends between a first position, in which the respective secondary wishbone knife 111 is outside the poultry carcass and a second position, in which the respective secondary wishbone knife 111 is arranged inside the poultry carcass, adjacent to the wishbone 1 and outside of the limb 3 of the wishbone 1. FIG. 9 shows the secondary wishbone knives 111 in their second position.

In the embodiment of FIG. 9, the primary wishbone cutter 8 is moveable between a first position outside the poultry carcass and a second position in which the front cutter portion and the wishbone limb cutter portion are inside the poultry carcass. The direction of movement from the first position to the second position is the cutting direction 15. The front cutter portion and the wishbone limb cutter portion are adapted to be introduced into the poultry carcass via the neck opening.

FIG. 9 shows the primary wishbone cutter 10 in its second position.

In the embodiment of FIG. 9, the secondary wishbone knives actuator assembly 120 comprises two cams track 121, 122. Each cam track 121, 122 is associated with a secondary wishbone knife 111. Each secondary wishbone knife has a cam follower 124, which is moveable through the respective cam track 121, 122.

In the embodiment of FIG. 9, the primary wishbone cutter 8 and the secondary wishbone knives 111 are mounted on a moveable mounting block 123. The secondary wishbone knives actuator assembly 120 is adapted to move said mounting block 123 relative to the frame 101 when the secondary wishbone knives 111 are moved from their respective first position to their respective second position or vice versa. A cylinder 125, e.g. a pneumatic cylinder, is provided to effect this movement.

In the embodiment of FIG. 9, the primary wishbone cutter 8 is also mounted onto the mounting block 123. When the cylinder 125 is actuated, the mounting block 123 moves both the primary wishbone cutter 8 and the secondary wishbone knives 111 relative to the frame 101 of the device 100, and during operation, relative to the poultry carcass.

In the embodiment of FIG. 9, the secondary wishbone knives 111 are pivotably mounted to the mounting block 123. The secondary wishbone knives actuator assembly 120 is adapted to move the mounting block 123 relative to the cam tracks 121, 122 when the secondary wishbone knives 111 are moved from their respective first position to their respective second position or vice versa.

The cam tracks 121, 122 are only in one way moveable relative to the frame 101, which is by pivoting around pivot 130, which is part of the system for switching from the small carcass mode to the large carcass mode or vice versa. So, when cylinder 125 moves the mounting block 123 with the primary wishbone cutter 8 and the secondary wishbone knifes 111 in the cutting direction 15, the cam tracks 121, 122 remain stationary relative to the device frame 101. This causes a relative movement of the cam followers 124 in the cam tracks 121, 122, which in turn causes the secondary wishbone knives 11 to pivot relative to the mounting block 123. The combined motion that is prescribed to the secondary wishbone knives 111 (i.e. the movement in the cutting direction by the cylinder 125 and the pivoting by the cam tracks 121, 122) results in curved secondary cutting paths for the secondary wishbone knives 111.

In accordance with the second aspect of the invention, the secondary wishbone knives actuator assembly 110 has a small carcass mode and a large carcass mode. The secondary cutting path that is prescribed when the secondary wishbone knives actuator assembly 110 is in the small carcass mode differs from the secondary cutting path that is prescribed when the secondary wishbone knives actuator assembly 110 is in the large carcass mode.

In the embodiment of FIG. 9, this feature is obtained by allowing the cam tracks 121, 122 to assume two different positions relative to the device frame 101, one position being associated with the small carcass mode and the other position being associated with the large carcass mode.

In the embodiment of FIG. 9, the cam tracks 121, 122 are pivotable relative to the frame 101 about pivot 130.

In addition a cam track adjuster 131 has been provided, which in this embodiment is a cylinder, e.g. a pneumatic cylinder. The cylinder comprises a cylinder head 133. The cylinder head comprises a pin which extends through adjustment slots 132, which are provided in the same bodies that also contain one of the cam tracks 121, 122. The position of the cam track adjuster 131 (i.e. cylinder extended or retracted) determines whether the cam tracks 121, 122 are in the position that is associated with the small carcass mode or in the other position, that is associated with the large carcass mode. By extending or retracting the piston of the cylinder of the cam track adjuster 131, the pin of the cylinder head 133 moves through the adjustment slots, and therewith, the cam tracks 121, 122 are rotated about pivot 130 relative to the device frame 101.

During operation of the wishbone separator device 100, the cam track adjuster maintains its extended or retracted position, so switching between the small carcass mode and the large carcass mode only occurs during idle time of the wishbone separator device 100.

Figure 10:
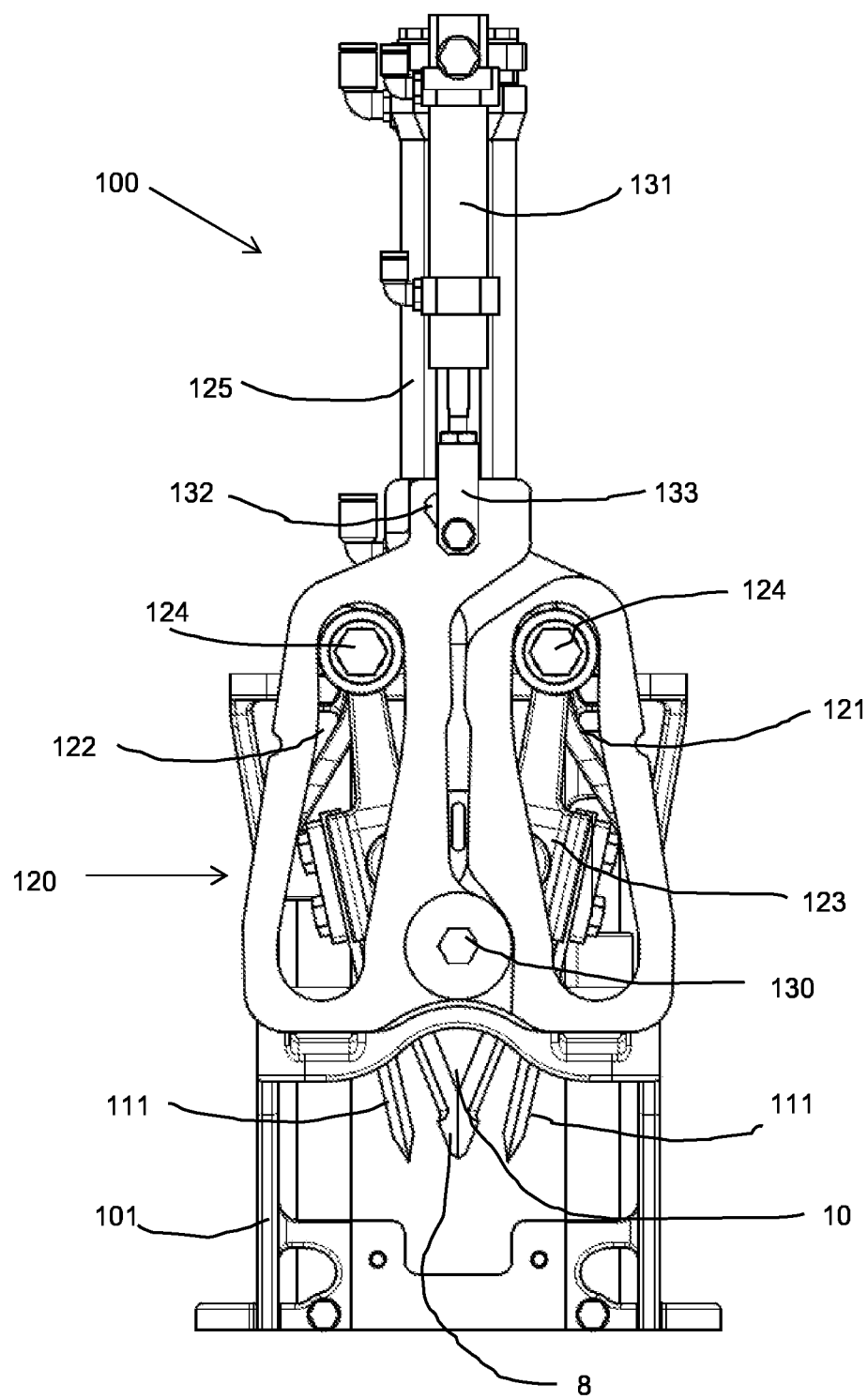
FIG. 10: illustrates the embodiment of FIG. 9, in front view, with the primary wishbone cutter and the secondary wishbone knives in their respective first positions and the secondary wishbone knives actuator assembly in the large carcass mode.

FIG. 10 shows the embodiment of FIG. 9, in front view, with the primary wishbone cutter 8 and the secondary wishbone knives 111 in their respective first positions and the secondary wishbone knives actuator assembly 120 in the large carcass mode.

The wishbone separator device is in this position at the start of the wishbone separating process, when the next poultry carcass to be processed is classified as being in the range "large" or "intermediate".

The mounting block 123 is in its high position relative to the device frame 101, and therewith the primary wishbone knife 10 and the secondary wishbone knives 111 are in their respective first positions. The cam followers 124 are at the top end of the cam tracks 121, 122. If a poultry carcass is arranged at the device 100, the primary wishbone knife 8 and the secondary wishbone knives 111 are arranged outside the poultry carcass.

The secondary wishbone knives actuator assembly is in the large carcass mode, which in this embodiment involves that the upper parts of the cam tracks 121, 122 are relatively far away from one another. The cylinder of the cam track adjuster 131 is in its extended position, and the pin in the cylinder head 133 is in the lower part of the adjustment slots 132.

Figure 11:
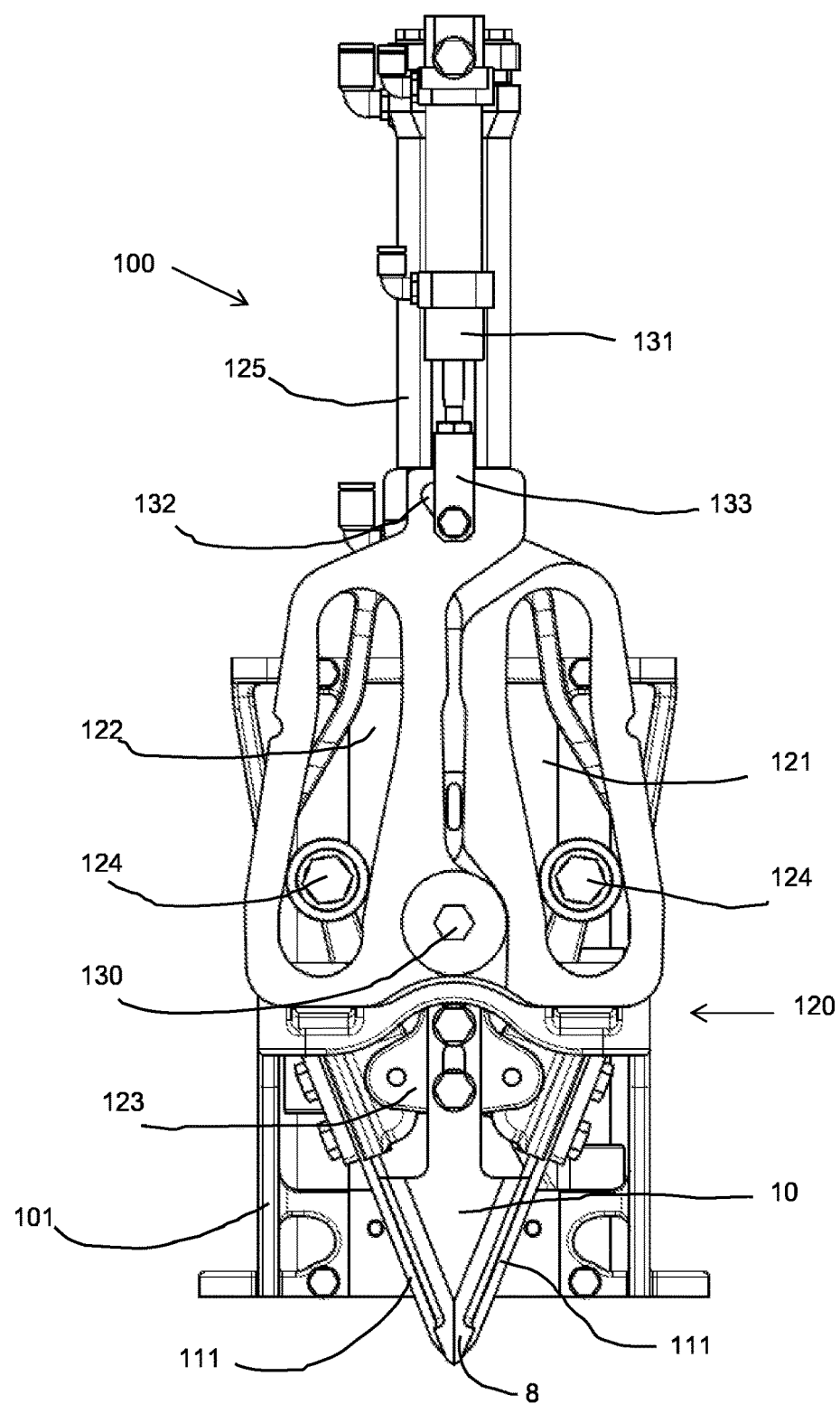
FIG. 11: illustrates the embodiment of FIG. 9, in front view, with the primary wishbone cutter and the secondary wishbone knives in their respective second positions and the secondary wishbone knives actuator assembly in the large carcass mode.

FIG. 11 shows the embodiment of FIG. 9, in front view, with the primary wishbone cutter 8 and the secondary wishbone knives 111 in their respective second positions and the secondary wishbone knives actuator assembly 120 in the large carcass mode.

The wishbone separator device is in this position just after cutting through the limbs of the wishbone, separating the hypocledium from the meat adjacent to the inward facing surface of the hypocledium and separating the meat from the outside of the limbs of the wishbone (and optionally severing the hypocledial ligament), but before the wishbone is actually removed from the poultry carcass. The poultry carcass that is processed is classified as being in the range "large" or "intermediate".

The mounting block 123 is in its low position relative to the device frame 101, and therewith the primary wishbone knife 10 and the secondary wishbone knives 111 are in their respective second positions. Moving the mounting block 123 relative to the device frame 101 can for example be achieved by means of providing the secondary wishbone knives actuator assembly with a cam track (which is e.g. mounted stationary around the central axis of a carrousel) and a cam follower that is connected to the mounting block and which runs in this cam track.

The cam followers 124 of the secondary wishbone knives 111 are near the bottom end of the cam tracks 121, 122. If a poultry carcass is arranged at the device 100, the primary wishbone knife 8 and the secondary wishbone knives 111 are arranged inside the poultry carcass, the primary wishbone knife 10 at least to such an extent that the front cutter portion and the wishbone limb cutting portion are inside the poultry carcass.

The secondary wishbone knives actuator assembly is still in the small carcass mode. The cylinder of the cam track adjuster 131 has not been actuated.

Figure 12:
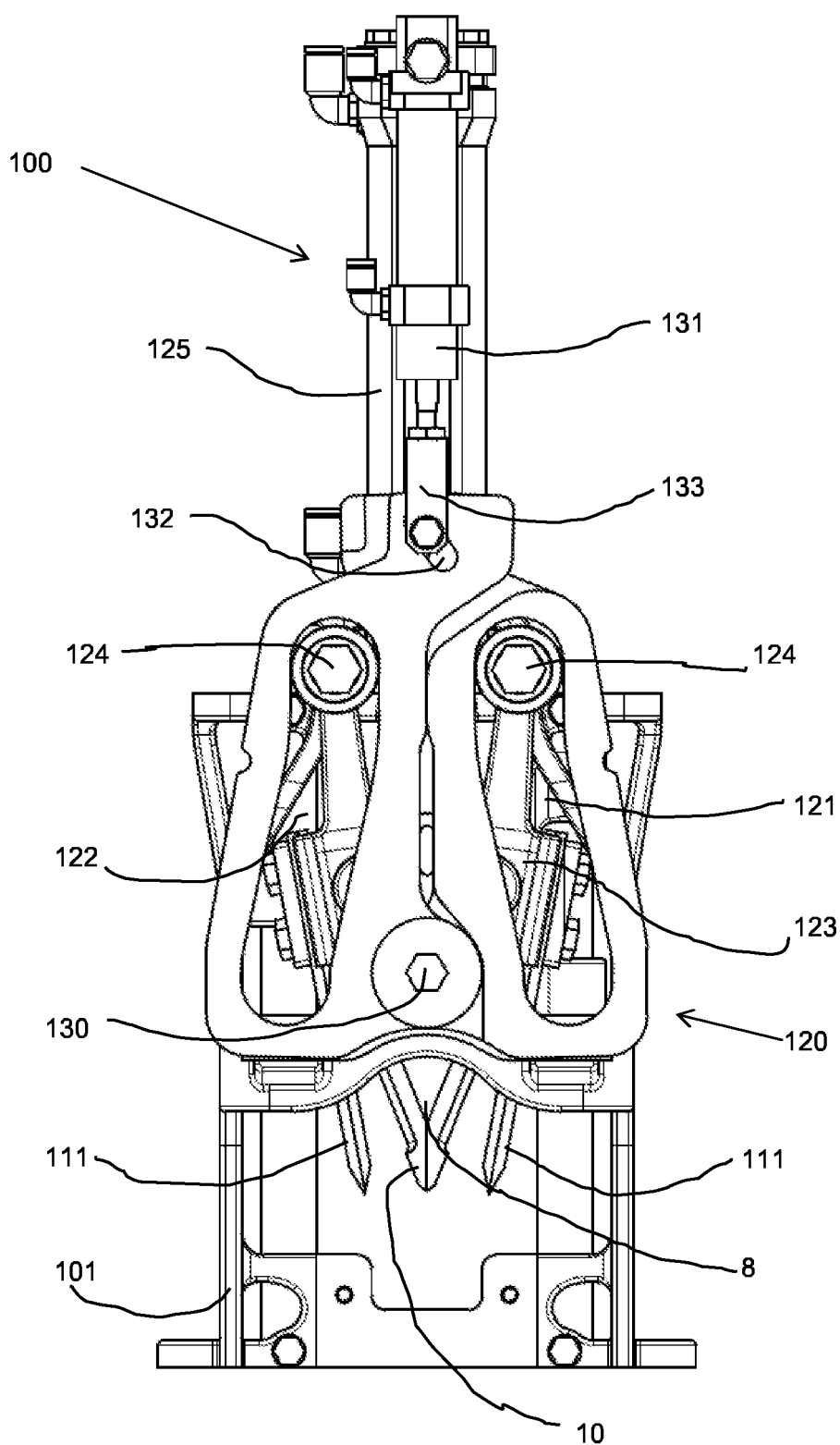
FIG. 12: illustrates the embodiment of FIG. 9, in front view, with the primary wishbone cutter and the secondary wishbone knives in their respective first positions and the secondary wishbone knives actuator assembly in the small carcass mode.

FIG. 12 shows the embodiment of FIG. 9, in front view, with the primary wishbone cutter 8 and the secondary wishbone knives 111 in their respective first positions and the secondary wishbone knives actuator assembly 120 in the small carcass mode.

The wishbone separator device is in this position at the start of the wishbone separating process, when the next poultry carcass to be processed is classified as being in the range "small" or "intermediate".

The mounting block 123 is in its high position relative to the device frame 101, and therewith the primary wishbone knife 10 and the secondary wishbone knives 111 are in their respective first positions. The cam followers 124 are at the top end of the cam tracks 121, 122. If a poultry carcass is arranged at the device 100, the primary wishbone knife 8 and the secondary wishbone knives 111 are arranged outside the poultry carcass.

The secondary wishbone knives actuator assembly 120 is in the small carcass mode, which in this embodiment involves that the upper parts of the cam tracks 121, 122 are relatively close from one another. The cylinder of the cam track adjuster 131 is in its retracted position, and the pin in the cylinder head 133 is in the upper part of the adjustment slots 132.

The secondary wishbone knives actuator assembly 120 can be shifted from the large carcass mode to the small carcass mode and vice versa by actuating the cylinder of the cam track adjuster 131. By extending or retracting the piston of the cylinder of the cam track adjuster 131, the pin of the cylinder head 133 moves through the adjustment slots, and therewith, the cam tracks 121, 122 are rotated about pivot 130 relative to the device frame 101 from the small carcass mode to the large carcass mode or vice versa.

The invention claimed is:

1. A wishbone separator device for separating a wishbone from a poultry carcass, said wishbone comprising a hypocledium and two limbs, said hypocledium comprising an inward facing surface, said wishbone separator device comprising:
   a primary wishbone cutter moveable in a cutting direction, said primary wishbone cutter comprising:
      a substantially triangular front cutter portion adapted to separate the hypocledium from meat that is present adjacent to the inward facing surface of the hypocledium, said front cutter portion comprising a central front apex that points in the cutting direction and a left front cutting edge and a right front cutting edge, the left front cutting edge and the right front cutting edge diverging from said central front apex; and
      a substantially triangular wishbone limb cutter portion adapted to cut through the limbs of the wishbone, said wishbone limb cutter portion comprising a left limb cutting edge and a right limb cutting edge,
   wherein an intersection point of an imaginary extension line of the left limb cutting edge and an imaginary extension line of the right limb cutting edge is arranged on an imaginary center line that extends in forward and rearward direction parallel to the cutting direction through the central front apex of the front cutter portion, and
   wherein the left front cutting edge is arranged forward of the left limb cutting edge as seen in the cutting direction and outward relative to said imaginary extension line from the left limb cutting edge and the right front cutting edge is arranged forward of the right limb cutting edge as seen in the cutting direction and outward relative to said imaginary extension line from the right limb cutting edge.

2. The wishbone separator device according to claim 1, wherein the primary wishbone cutter comprises a primary wishbone knife, which comprises the front cutter portion and the wishbone limb cutter portion.

3. The wishbone separator device according to claim 1, wherein the primary wishbone cutter comprises:
   a front cutter knife which comprises the front cutter portion of the primary wishbone cutter; and
   a wishbone limb cutter knife which comprises the wishbone limb cutter portion of the primary wishbone cutter.

4. The wishbone separator device according to claim 1, wherein the poultry carcass further comprises a neck opening,
- wherein the primary wishbone cutter is moveable between a first position outside the poultry carcass and a second position in which the front cutter portion and the wishbone limb cutter portion are inside the poultry carcass, the direction of movement from the first position to the second position being the cutting direction, and
- wherein the front cutter portion and the wishbone limb cutter portion are adapted to be introduced into the poultry carcass via the neck opening.

5. The wishbone separator device according to claim 4, wherein when the primary wishbone cutter is in its second position and the two secondary wishbone knives are in their respective second positions, at least a part of the left limb cutting edge is at a distance from the secondary wishbone knife that is adjacent to the left limb cutting edge, and at least a part of the right limb cutting edge is at a distance from the secondary wishbone knife that is adjacent to the right limb cutting edge.

6. The wishbone separator device according to claim 1, wherein the wishbone separator device further comprises a secondary wishbone cutter, said secondary wishbone cutter comprising two secondary wishbone knives, each adapted for separating the wishbone from meat that is present on the outside of a limb of the wishbone, and
- wherein each of said secondary wishbone knives being is moveable between a first position, in which said secondary wishbone knife is outside the poultry carcass, and a second position, in which said secondary wishbone knife is arranged inside the poultry carcass, adjacent to the wishbone and outside of the limb of the wishbone.

7. The wishbone separator device according to claim 6, wherein the wishbone separator device further comprises a wishbone cutter actuator adapted to move the primary wishbone cutter in the cutting direction,
- wherein said wishbone cutter actuator is adapted to move the primary wishbone cutter from its first position to its second position and vice versa,
- wherein said wishbone cutter actuator is further adapted to move both secondary wishbone knives from their respective first position to their respective second position and vice versa, and
- wherein the wishbone cutter actuator comprises a single driver.

8. A wishbone separator system, comprising a plurality of said wishbone separator devices according to claim 1,
- wherein the wishbone separator devices are arranged in a carrousel.

9. A wishbone knife, adapted for use in the wishbone separator device according to claim 1, said wishbone knife comprising:
- a substantially triangular front cutter portion adapted to separate the hypocledium from meat that is present adjacent to the inward facing surface of the hypocledium, said front cutter portion comprising a central front apex that points in the cutting direction and a left front cutting edge and a right front cutting edge, the left front cutting edge and the right front cutting edge diverge from said central front apex,
- a substantially triangular wishbone limb cutter portion adapted to cut through the limbs of the wishbone, said wishbone limb cutter portion comprising a left limb cutting edge and a right limb cutting edge,
- wherein an intersection point of an imaginary extension line of the left limb cutting edge and an imaginary extension line of the right limb cutting edge is arranged on an imaginary center line that extends in forward and rearward direction parallel to the cutting direction through the central front apex of the front cutter portion, and
- wherein the left front cutting edge is arranged forward of the left limb cutting edge as seen in the cutting direction and outward relative to said imaginary extension line from the left limb cutting edge and the right front cutting edge is arranged forward of the right limb cutting edge as seen in the cutting direction and outward relative to said imaginary extension line from the right limb cutting edge.

10. The wishbone knife according to claim 9, wherein the left front cutting edge and the right front cutting edge enclose a front cutting angle, and the left limb cutting edge and the right limb cutting edge enclose a limb cutting angle, wherein the front cutting angle is larger than or equal to the limb cutting angle.

11. A method for separating a wishbone from a poultry carcass, the poultry carcass comprising a neck opening, a breastbone and a wishbone having a hypocledium and two limbs, said hypocledium having an inward facing surface, said method comprising the following steps:
- moving the primary wishbone cutter of the wishbone separator device in accordance with claim 1 in a cutting direction from a first position, which is locatedoutside the poultry carcass, towards a second position in which the front cutter portion and the wishbone limb cutter portion is arranged inside the poultry carcass, thereby introducing the primary wishbone cutter into the poultry carcass via the neck opening; and
- during the movement of the primary wishbone cutter from the first position to the second position, cutting though the limbs of the wishbone and separating the hypocledium from meat that is present adjacent to the inward facing surface of the hypocledium,
- wherein the cutting through of the limbs of the wishbone occurs at the same time or after the separation of the hypocledium from the meat that is present adjacent to the inward facing surface of the hypocledium.

12. The method according to claim 11, wherein the wishbone separator device further comprises a secondary wishbone cutter, said secondary wishbone cutter comprising two secondary wishbone knives, each adapted for separating the wishbone from meat that is present on the outside of a limb of the wishbone, and wherein each of said secondary wishbone knives being is moveable between a first position, in which said secondary wishbone knife is outside the poultry carcass, and a second position, in which said secondary wishbone knife is arranged inside the poultry carcass, adjacent to the wishbone and outside of the limb of the wishbone, said method further comprising the step of:
- moving the secondary wishbone knives of a wishbone separator device from their respective first position, which is located outside the poultry carcass towards their respective second position in which said secondary wishbone knife is arranged inside the poultry carcass.

13. The method according to claim 11, wherein the primary wishbone cutter comprises a front cutter knife which comprises the front cutter portion of the primary wishbone cutter; and a wishbone limb cutter knife which comprises the wishbone limb cutter portion of the primary wishbone cutter, and wherein the step of moving the primary wishbone cutter in a cutting direction from a first position, which is located outside the poultry carcass, towards a second position in which front cutter portion and the wishbone limb cutter portion is arranged inside the poultry carcass involves:
moving the front cutter knife of a wishbone separator device from a position outside the poultry carcass to a position inside the poultry carcass, thereby separating the hypocledium from meat that is present adjacent to the inward facing surface of the hypocledium by the front cutter portion of the front cutter knife; and
moving the wishbone limb cutter knife of said wishbone separator device from a position outside the poultry carcass to a positioninside the poultry carcass, thereby cutting through the limbs of the wishbone by the wishbone limb cutter portion of the wishbone limb cutter knife.

14. A method for separating a wishbone from a poultry carcass, the poultry carcass comprising a neck opening, a breastbone and a wishbone having a hypocledium and two limbs, said hypocledium having an inward facing surface, said method comprising the following steps:
moving the primary wishbone cutter of the wishbone separator device in accordance with claim 1 in a cutting direction from a first position, which is located outside the poultry carcass, towards a second position in which the front cutter portion and the wishbone limb cutter portion is arranged inside the poultry carcass, thereby introducing the primary wishbone cutter into the poultry carcass via the neck opening; and
during the movement of the primary wishbone cutter from the first position to the second position, cutting though the limbs of the wishbone and separating the hypocledium from meat that is present adjacent to the inward facing surface of the hypocledium,
wherein the cutting through of the limbs of the wishbone occurs before the separation of the hypocledium from the meat that is present adjacent to the inward facing surface of the hypocledium, wherein the distance from the central front apex of the front cutter portion to the hypocledium at the moment of cutting through the limbs of the wishbone is less than 10 mm.

15. A wishbone separator device for separating a wishbone from a poultry carcass, said wishbone comprising a hypocledium and two limbs, said hypocledium having an inward facing surface, said device comprising:
a primary wishbone cutter adapted to cut through the limbs of the wishbone and to separate the hypocledium from meat that is present adjacent to the inward facing surface of the hypocledium,
a secondary wishbone cutter comprising:
two secondary wishbone knives, each adapted for separating the wishbone from meat that is present on the outside of a limb of the wishbone; and
a secondary wishbone knives actuator assembly, the secondary wishbone knives actuator assembly being adapted to prescribe a secondary cutting path for each of the secondary wishbone knives relative to the poultry carcass,
each of said secondary cutting paths extending between a first position, in which said secondary wishbone knife is outside the poultry carcass and a second position, in which said secondary wishbone knife is arranged inside the poultry carcass, adjacent to the wishbone and outside of the limb of the wishbone, and
wherein the secondary wishbone knives actuator assembly has a small carcass mode and a large carcass mode, wherein the secondary cutting path that is prescribed when the secondary wishbone knives actuator assembly is in the small carcass mode differs from the secondary cutting path that is prescribed when the secondary wishbone knives actuator assembly is in the large carcass mode.

16. The wishbone separator device according to claim 15, wherein the second position of the secondary wishbone knives is the same in the small carcass mode and in the large carcass mode.

17. The wishbone separator device according to claim 15, wherein the secondary wishbone knives actuator assembly comprises two cam tracks, each associated with a secondary wishbone knife, and wherein the relative position of the cam tracks in the small carcass mode differs from the relative position of the cam tracks in the large carcass mode.

18. The wishbone separator device according to claim 15, wherein the wishbone separator device further comprises a frame, and wherein the primary wishbone cutter and the secondary wishbone knives are mounted on a moveable mounting block, and wherein the secondary wishbone knives actuator assembly is adapted to move said mounting block relative to the frame when the secondary wishbone knives are moved from their respective first position to their respective second position or vice versa.

19. The wishbone separator device according to claim 17, wherein the secondary wishbone knives are pivotably mounted to the mounting block and the secondary wishbone knives actuator assembly is adapted to move the mounting block relative to the cam tracks when the secondary wishbone knives are moved from their respective first position to their respective second position or vice versa.

20. The wishbone separator device according to claim 19, wherein the wishbone separator device further comprises a frame, and wherein the cam tracks are moveably, connected to said frame, and wherein the position of the cam tracks relative to said frame in the small carcass mode differs from the position of the cam tracks relative to said frame in the large carcass mode.

21. The wishbone separator device according to claim 20, wherein the secondary wishbone knives actuator assembly comprises a cam track adjuster which is adapted to shift the position of the cam tracks relative to the frame from the position associated with the small carcass mode to the position associated with the large carcass mode and/or vice versa.

22. A wishbone separator device for separating a wishbone from a poultry carcass, said wishbone comprising a hypocledium and two limbs, said hypocledium comprising an inward facing surface, said wishbone separator device comprising:
a primary wishbone cutter is moveable in a cutting direction, said primary wishbone cutter comprising:
a substantially triangular front cutter portion which is adapted to separate the hypocledium from meat that is present adjacent to the inward facing surface of the hypocledium, which front cutter portion comprises a central front apex that points in the cutting direction and a left front cutting edge and a right front cutting edge, the left front cutting edge and the right front cutting edge diverge from said central front apex,
a substantially triangular wishbone limb cutter portion adapted to cut through the limbs of the wishbone, saide wishbone limb cutter portion comprising a left limb cutting edge and a right limb cutting edge, wherein an intersection point of an imaginary extension line of the left limb cutting edge and an imaginary extension line of the right limb cutting edge is arranged on an imaginary center line that extends in forward and rearward direction parallel to the cutting direction through the central front apex of the front cutter portion, wherein the left front cutting edge is arranged forward of the left limb cutting edge as seen in the cutting direction and outward relative to said imaginary extension line from the left limb cutting edge and the right front cutting edge is arranged forward of the right limb cutting edge as seen in the cutting direction and outward relative to said imaginary extension line from the right limb cutting edge, wherein said wishbone separator device further comprises a secondary wishbone cutter which comprises comprising:

two secondary wishbone knives, each adapted for separating the wishbone from meat that is present on the outside of a limb of the wishbone; and a secondary wishbone knives actuator assembly, whereing the secondary wishbone knives actuator assembly is adapted to prescribe a secondary cutting path for each of the secondary wishbone knives relative to the poultry carcass, wherein each of said secondary cutting paths extending between a first position, in which said secondary wishbone knife is outside the poultry carcass and a second position, in which said secondary wishbone knife is arranged inside the poultry carcass, adjacent to the wishbone and outside of the limb of the wishbone, and wherein the secondary wishbone knives actuator assembly has a small carcass mode and a large carcass mode, wherein the secondary cutting path that is prescribed when the secondary wishbone knives actuator assembly is in the small carcass mode differs from the secondary cutting path that is prescribed when the secondary wishbone knives actuator assembly is in the large carcass mode.

* * * * *